United States Patent
Miyaki

(10) Patent No.: US 11,537,264 B2
(45) Date of Patent: Dec. 27, 2022

(54) METHODS AND SYSTEMS FOR PROVIDING SHORTCUTS FOR FAST LOAD WHEN MOVING BETWEEN SCENES IN VIRTUAL REALITY

(71) Applicant: Sony Interactive Entertainment LLC, San Mateo, CA (US)

(72) Inventor: Ken Miyaki, San Diego, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 15/893,552

(22) Filed: Feb. 9, 2018

(65) Prior Publication Data
US 2019/0250773 A1 Aug. 15, 2019

(51) Int. Cl.
| | |
|---|---|
| *G06F 3/0482* | (2013.01) |
| *G06F 3/04815* | (2022.01) |
| *G06F 3/01* | (2006.01) |
| *A63F 13/5255* | (2014.01) |
| *A63F 13/211* | (2014.01) |
| *A63F 13/25* | (2014.01) |
| *A63F 13/212* | (2014.01) |

(Continued)

(52) U.S. Cl.
CPC .......... *G06F 3/0482* (2013.01); *A63F 13/211* (2014.09); *A63F 13/212* (2014.09); *A63F 13/25* (2014.09); *A63F 13/50* (2014.09); *A63F 13/5255* (2014.09); *A63F 13/67* (2014.09); *G06F 3/013* (2013.01); *G06F 3/04815* (2013.01)

(58) Field of Classification Search
CPC ...... G06F 3/011; G06F 3/013; G06F 3/04815; G06F 3/0482; G06F 2212/6028; G06F 2212/6022; G06T 19/006; G02B 27/0172; A63F 13/358; A63F 2300/8082
See application file for complete search history.

(56) References Cited

U.S. PATENT DOCUMENTS

| | | | |
|---|---|---|---|
| 6,023,726 A | 2/2000 | Saksena | |
| 6,067,565 A * | 5/2000 | Horvitz | H04L 29/06 709/218 |

(Continued)

FOREIGN PATENT DOCUMENTS

WO    WO 2016/195733 A1    12/2016

OTHER PUBLICATIONS

ISR PCT/US2019/014369, Dated May 23, 2019, 4 pages.

*Primary Examiner* — Eric J. Bycer
(74) *Attorney, Agent, or Firm* — Penilla IP, APC

(57) ABSTRACT

Methods and systems for providing access to virtual scenes of an interactive application include receiving a selection of the interactive application. In response to the selection, a virtual scene of the application is provided. Interactivity of the user detected in the virtual scene is processed to identify predicted interaction with visual options in the virtual scene. The processing continues till a threshold of actions indicative of imminent selection of one of the visual options is reached. A second virtual scene associated with the visual option that was identified to be imminently selected, is pre-loaded, based on achieving the threshold. The second virtual scene is executed using the pre-loaded content, when the visual option associated with the second virtual scene is selected, so as to enable full rendering of the second virtual scene for user interaction.

12 Claims, 17 Drawing Sheets

(51) Int. Cl.
*A63F 13/50* (2014.01)
*A63F 13/67* (2014.01)

(56) References Cited

U.S. PATENT DOCUMENTS

| | | | | |
|---|---|---|---|---|
| 7,934,058 | B2* | 4/2011 | Hawkins | A63F 13/00 |
| | | | | 711/137 |
| 9,959,506 | B1* | 5/2018 | Karppanen | G06F 16/9574 |
| 2003/0065668 | A1* | 4/2003 | Sowizral | G06T 15/20 |
| 2004/0036675 | A1 | 2/2004 | Kajitsuka | |
| 2008/0301300 | A1* | 12/2008 | Toub | H04L 67/02 |
| | | | | 709/227 |
| 2009/0287750 | A1* | 11/2009 | Banavar | H04L 67/04 |
| 2009/0292513 | A1* | 11/2009 | Watte | A63F 13/358 |
| | | | | 703/6 |
| 2010/0302283 | A1 | 12/2010 | Sasaki et al. | |
| 2012/0004042 | A1* | 1/2012 | Perry | A63F 13/77 |
| | | | | 463/42 |
| 2012/0284597 | A1* | 11/2012 | Burkard | G06F 17/2235 |
| | | | | 715/205 |
| 2013/0047098 | A1* | 2/2013 | Shuster | G06T 19/20 |
| | | | | 715/757 |
| 2013/0141428 | A1* | 6/2013 | Gipson | G06F 3/04815 |
| | | | | 345/419 |
| 2013/0151651 | A1* | 6/2013 | Chhaochharia | A63F 13/358 |
| | | | | 709/214 |
| 2014/0189539 | A1* | 7/2014 | St. Clair | G06Q 50/01 |
| | | | | 715/753 |
| 2014/0354515 | A1* | 12/2014 | LaValle | G02B 27/017 |
| | | | | 345/8 |
| 2015/0277710 | A1* | 10/2015 | Lee | G06F 3/0488 |
| | | | | 715/822 |
| 2015/0312375 | A1* | 10/2015 | Valey | G06F 9/451 |
| | | | | 709/203 |
| 2016/0080442 | A1 | 3/2016 | Justice et al. | |
| 2016/0219325 | A1* | 7/2016 | Chu | H04N 21/42653 |
| 2016/0256784 | A1* | 9/2016 | Schultz | A63F 13/358 |
| 2018/0262687 | A1* | 9/2018 | Hildreth | H04N 13/204 |
| 2019/0332688 | A1* | 10/2019 | Valentine | G06F 16/168 |

* cited by examiner

METHODS AND SYSTEMS FOR PROVIDING SHORTCUTS FOR FAST LOAD WHEN MOVING BETWEEN SCENES IN VIRTUAL REALITY

BACKGROUND

Field

The present disclosure is related to interactive applications executing on a server, and is specifically directed to providing shortcuts for faster access of different scenes or portions of the interactive applications.

Description of the Related Art

The advancement in computer technology has led to advancement in cloud based processing, video game technology, etc. With the advancement in cloud based processing (i.e., using high powered graphics processors, memory, and other processing and communication resources), users are presented with an interactive experience that is both desirable and optimal. For example, cloud-based systems provide unlimited processing power and system resources for execution of interactive applications, such as video games. In the case of video games, the cloud-based systems make an overwhelming breadth of legacy and new video games available for users to access and play without having to upgrade their own devices. These cloud-based systems enable streaming of content to remote clients, wherein most processing is done on servers, which may be distributed. Cloud-based interactive applications, such as gaming, therefore, has been increasing in popularity because users find it easier to access more video game titles without complex hardware restrictions, and game suppliers find it easier to manage game code from centralized locations.

At a more personal level, devices are being developed to assist the users in selecting and interacting with content that is available on a remote server of a cloud-based system or on a local device, such as a game console or local computer. For example, head mounted displays (HMDs) have been developed and are increasing in popularity as it allows the user to have an immersive interactive experience, such as immersive gaming experience, by allowing the user to interact with content presented on a display of the HMD. Similarly, various input devices, such as controllers, have been developed to assist the user in providing inputs to the interactive content. The cloud system makes it easier to introduce newer devices as majority of the processing is done at the server level and newer devices can be easily integrated at the cloud level rather than at an individual system level.

When a user selects an interactive application to view or interact with, the user is provided with content from an initial scene of the interactive application. As the user interacts with the content and progresses to a next scene, the user has to wait till the second scene loads up. Oftentimes, the waiting is noticeable as some of the applications include graphic intensive content, leading to less desirable experience.

It is in this context that embodiments of the invention arise.

SUMMARY OF THE INVENTION

Embodiments of the present invention disclose methods and systems that are used for provide shortcuts to enable faster access to different scenes of an interactive application executing on a server of the system. Visual options available in a virtual scene are used to access additional virtual scenes. Faster access to each of the additional virtual scenes is provided by pre-loading content of the corresponding additional virtual scenes based on predicted interactions of the user with different visual options in the virtual scene. The pre-loaded content of the additional virtual scenes associated with the different visual options is ready for execution to enable full rendition of the corresponding virtual scenes for user interactivity, as soon as the corresponding visual option is selected by the user. The pre-loading allows faster access to the content of the different virtual scenes without causing unnecessary wait for the user. The system includes a head mounted display (HMD) that is in communication with a server, which could be part of a cloud based system accessed via a network. The HMD is configured to render the virtual scenes of the interactive application. The system is configured to host a plurality of online, interactive applications for user interactions (e.g., video game applications and other interactive applications—both single user and multi-user applications), using resources available to the cloud system.

The system detects selection of an interactive application and, in response, provides content of an initial virtual scene to the HMD of a user for rendering. The virtual scene includes visual options with each visual option configured to access a distinct virtual scene of the interactive application. The system tracks interactivity of the user in the virtual scene and processes the interactivity to identify predicted interactions with different visual options included in the virtual scene. The processing includes evaluating the interactivity of the user till a threshold of actions that is indicative of selection of a particular visual option, is reached. Based on the threshold being reached, the system identifies and pre-loads content of corresponding virtual scene associated with the particular visual option. The pre-loading is done in advance of the user selecting the particular visual option, so that when the user selects the particular visual option, the content that is pre-loaded is executed to enable full rendering of the corresponding virtual scene for interactivity by the user.

In one implementation, a method is provided. The method includes receiving a selection of an interactive application for user interaction from a user wearing a head mounted display. The selection causes content of a virtual scene of the interactive application to be provided for rendering on the head mounted display. The content of the virtual scene includes visual options for accessing additional virtual scenes of the interactive application. User interactivity in the virtual scene is detected. The interactivity detected in the virtual scene is processed to identify predicted interaction with visual options in the virtual scene. The processing continues while the user is interacting in the virtual scene up till reaching a threshold of actions that is indicative of imminent selection of one of the visual options available in the virtual scene. Based on achieving the threshold, a second virtual scene associated with the visual option that was identified to be imminently selected is pre-loaded. The second virtual scene is executed using the pre-loaded content so as to enable full rendering of the second virtual scene for user interaction, when the visual option associated with the second virtual scene is selected by the user. The virtual scene and the second virtual scene are part of the interactive application.

In another implementation, a method is provided. The method includes receiving a selection of an interactive application from a user of a head mounted display (HMD). The selection causes content of a virtual scene of the interactive application to be provided for rendering on the HMD worn by the user. The content of the virtual scene includes visual options for accessing additional virtual scenes of the interactive application. A usage history of the user maintained for the interactive application is analyzed. The analysis is used to predict imminent selection of a first visual option from a plurality of visual options available within the virtual scene during the interactivity of the user in the virtual scene. A second virtual scene associated with the first visual option that was predicted to be imminently selected by the user, is pre-loaded. Interactivity of the user in the virtual scene is monitored. The monitored interactivity is continuously processed while the user interacts within the virtual scene until a threshold of actions is reached that indicates imminent selection of a specific one of the visual options. The method continues with the operation of determining if the specific one of the visual options that was identified for imminent selection matches the visual option associated with the second virtual scene that is being pre-loaded. When the specific one of the visual options matches the first visual option associated with the second virtual scene, executing content of the second virtual scene that was pre-loaded to enable full rendering of the second virtual scene for interactivity by the user, when the first visual option is selected by the user during interactivity in the virtual scene.

Other aspects and advantages of the invention will become apparent for one skilled in the art from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

Figure 1:
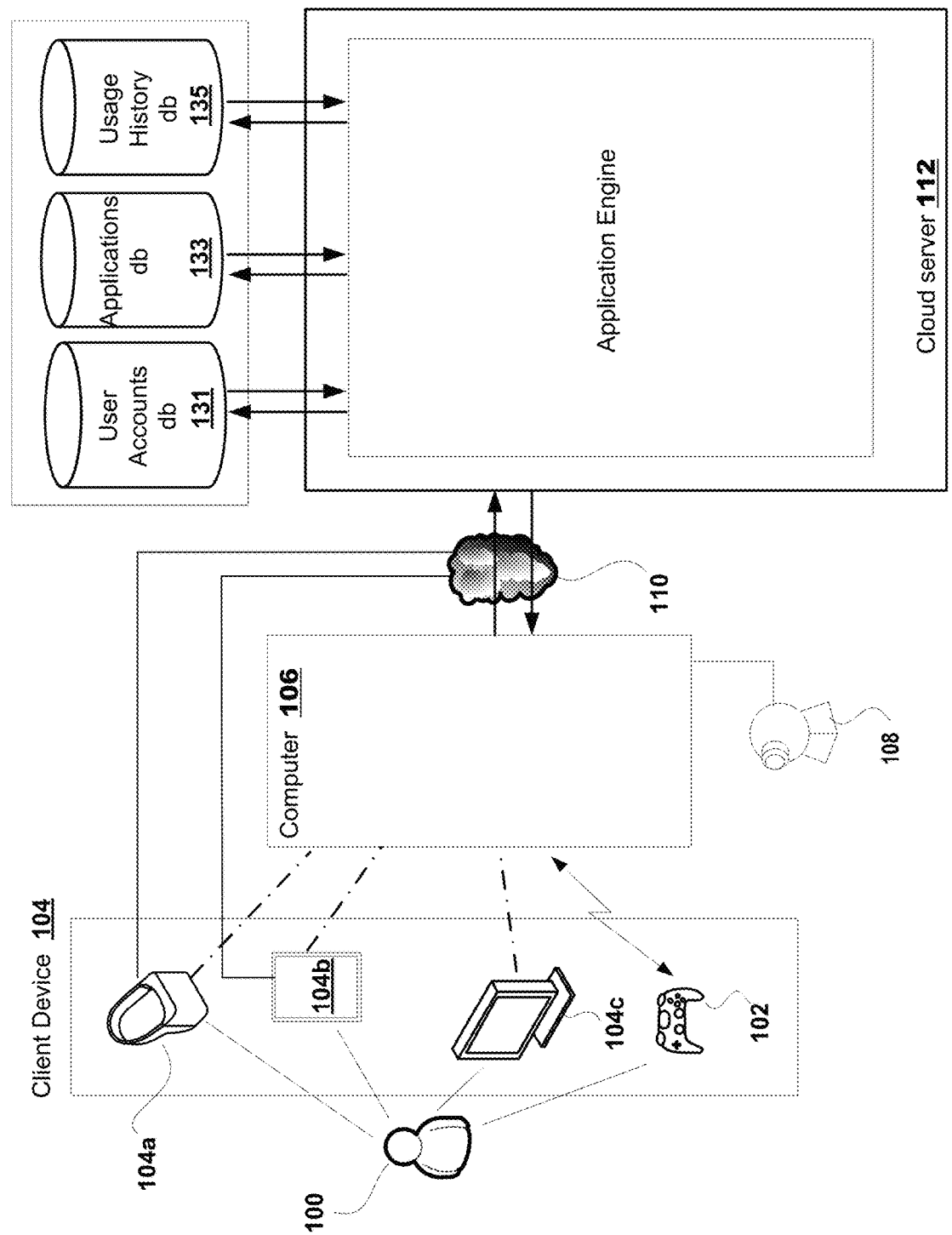
FIG. 1 illustrates a simplified block diagram of an example system that is used to evaluate cues provided by a user at various visual options in a virtual scene for pre-loading subsequent virtual scenes, in accordance with an implementation of the present invention.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

According to various implementations of the present invention, a user wearing a head mounted display (HMD) accesses a local server or a remote server on a cloud system, for example, through a user account and selects an interactive application, such as a video game. In response to the request, the server identifies a virtual scene of the interactive application and provides content of the virtual scene for rendering on a display screen of the HMD. The virtual scene may be a first virtual scene of the interactive application or a last virtual scene that the user was in during a previous session of the interactive application and the server may identify the virtual scene based on a current state of the previous session saved for the user. As part of servicing the request, the server uses the identifier of the user included in the request to retrieve the current state of the interactive application from the previous session (if any) of the user, to identify the virtual scene. Content from the virtual scene of the interactive application is provided to the user for interaction. The virtual scene includes one or more visual options for accessing other virtual scenes of the interactive application. Interactivity provided by the user in the virtual scene is processed to identify predicted interactions with various visual options included in the virtual scene to identify imminent selection of a specific one of the virtual options in the virtual scene. A second virtual scene associated with the specific one of the virtual options identified by user interactivity is identified and pre-loaded. The pre-loading of the second virtual scene is done in advance so that when the user actually selects the specific one of the visual options that is associated with the second virtual scene, the pre-loaded content of the second virtual scene is executed enabling the user to access and begin interacting with the second virtual scene without waiting.

The processing of the interactivity allows the system to determine the current interest of the user toward specific visual options expressed through various actions during interactions with content of the virtual scene. The current interest is determined by evaluating each of a plurality of interactive indicators captured during the user's interaction with the content of the virtual scene to identify a specific visual option as a target for imminent selection by the user. The system predicts selection of the visual option using the various interactive indicators (provided in the form of cues), and prepares the subsequent virtual scenes of the interactive application for user interaction based on such prediction.

Upon pre-loading the content of the virtual scene associated with the predicted selection of the visual option, the system continues to process the user's interactivity to determine if the user continues to express interest in the specific visual option or has switched to a different visual option. When the system detects a shift in the imminent selection from the visual option to a different visual option, the system dynamically determines the change and pre-loads a different virtual scene that corresponds with the different visual option. In some implementation, as part of pre-loading the different virtual scene, the system may unload the second virtual scene that was already pre-loaded in response to an initial interest of the user at the corresponding visual option.

In some implementations, as the user progresses through the various virtual scenes, certain ones of the initial virtual scenes that were loaded and executed may be unloaded to reduce memory usage. The certain ones of virtual scenes that are unloaded may be based on visual options available in subsequent virtual scenes.

The virtual space that can be viewed via the HMD is expansive. As a result, lot of content has to be loaded for the user to navigate. Further, the content presented in the HMD is provided in three-dimensional (3D) space and provides a view frustrum. The view frustrum, (otherwise termed as a field of view of a capturing, such as a camera) in some implementations, is defined as a region of space of a 3D modeled world that is projected on a display screen. It is typically obtained by taking a frustrum (i.e., a truncation with parallel planes) of a pyramid of vision. Due to the nature of three-dimensional format, lot of content has to be loaded in order for the user to have a totally immersive experience. Thus, even when certain content is currently not rendering at the HMD, the content has to be cached, loaded and ready to be processed to generate new frames in order to be available to the user as the user navigates in the 3D space. This is not the case in a two-dimensional (2D) environment. In 2D environment, every frame has all the content that the user needs to view. For example, if a character is moved in a 2D environment, a single frame can be used to capture such information and presented to the user. However, in the 3D environment, such details are captured in multiple frames and have to be made available to the user.

Thus, according to the various implementations, in order to provide a totally immersive experience to the user while ensuring optimal usage of system resources, the system collects various cues of a user, such as gaze direction, direction of movement, motion within the virtual scene, extension of a body part of a user wearing a wearable device, triggers using a controller, etc., and process these cues to predict the user's next move or selection in the virtual scene, including selection of a visual option, direction of movement toward a virtual object, etc. Based on the prediction of a visual option selection, content of a different virtual scene associated with the visual option is pre-loaded and cached into memory in advance of the user selection of the visual option to access the different virtual scene so that the content can be readily rendered and made available for user interaction.

The content for any virtual scene include graphic intensive content, such as artwork, 3D graphics, 3D dynamic characters, artificial intelligence (AI) characters, etc. In some implementations, the data related to the content is provided as input into a graphics processor that uses random generator technique to generate variations of the content that include variations in controlled movement of different characters or objects, so as to render variations of the content for different views. The pre-loading of virtual scenes based on evaluation of the cues allows the system to pre-load only the needed content in a timely manner for user interaction and to not overload content that is not accessed or needed. The various implementations enables the system to wisely allocate the network and system resources while minimizing wait time for the user, leading to an optimal interactive experience for the user.

Other advantages of the various implementations described herein will become apparent to one skilled in the art. With the general understanding of the invention, specific implementations will now be described with reference to the various drawings.

FIG. 1 illustrates a simplified block diagram of a system used for detecting a request for content of an interactive application, such as a game application. It should be noted that although various implementations are described in detail with reference to a game application, the implementations are not restricted to game applications but could also be extended to other types of interactive applications, such as virtual tours, etc. The request is received from a client device of a user, such as a head mounted display (HMD) worn by a user. The HMD 104 is communicatively connected to a server, such as an application server 112. The application server 112 may be local to the HMD 104 or can be a remote server that can be accessed via a network 110. An example network includes a local area network, a wide area network, a wireless local area network, a personal area network, a metropolitan area network, or it can be part of a cloud network that includes servers, game consoles, etc., distributed in one or more remote data centers, and can be accessed over a network 110, such as the Internet. The server 112 (i.e., cloud server) may be one of a plurality of servers in a data center.

The HMD 104 includes a processing module (i.e., processor), a memory and network or communication connections to connect to a computing device (e.g., a console) or a server that is accessed over a network and includes appropriate application programming interfaces (APIs) to communicate with a server-side application. The processor of the HMD 104 is capable of executing a client-side application that may run stand-alone or may interact with a server-side application by connecting to a local server computing device (e.g., computer 106) through wired or wireless connection, in some implementations. In other implementations, the HMD 104 may connect to the network 110 using network connections and use application programming interfaces (APIs) to communicate with or access server-side application hosted on a remote server 112 (e.g., remote cloud server). As in previous implementations, the network connection can be a wired or wireless connection. The various implementations are not restricted to the HMD 104 of FIG. 1 but could also include other client devices (e.g., a thin client, a general purpose computer, a special purpose computer, a game console, a personal computer, a lap top computer, a tablet computing device, a mobile computing device, a portable gaming device, a cellular phone, a smartphone, a set-top box, a streaming media interface/device, a smart television or networked display, or any other computing device that can be used to connect to a server available locally or remotely to access an interactive application).

The network connections and/or communication protocol used enable the HMD 104 to communicate with the server(s) to receive content, including stream(s) of video frames of multimedia content, from the server(s). The video frames streamed by the server(s) may have undergone compression using an encoder at the server side. Consequently, the HMD 104 may include a decoder to decompress the stream(s) of video frames representing application content transmitted by the server(s) (e.g., application servers), and render images on a display screen of the HMD 104. The rendered images identify current state of the interactive application, such as a game application. The current state of the application is substantially maintained and executed on the application server(s), with the HMD primarily functioning to receive, decode, render audio and/or video data from the application server(s), and communicate user inputs back to the application server(s).

An application server as used in this application may be a local server computing device (e.g., computer 106), a console server, a virtual computer, a cloud server 112, a digital media server, a server that is used to provide a storefront of a game developer or a game sponsor or an application developer or an application provider, a webserver, a terminal server, a remote server, or any other type or form of server computing device that is capable of hosting one or more interactive applications, (e.g., game application, virtual tours, etc.,) including providing or allocating processing resources for executing the interactive application that users can access and interact during use. The application server may include an encoder to compress the data in the video frames and forward the compressed video frames in a data stream to the HMD using API calls that follow specific type of communication protocol.

The application server (e.g., computer 106, cloud server 112, etc.,) executes the various interactive applications (e.g., games, virtual tours, etc.,) that are available for a user account, identifies current states of the interactive applications and provides appropriate content from specific one of the interactive applications for rendering at the HMD, based on a request received from the user. The content includes streaming video data, including image data, audio data, haptic data, etc. User input provided via the HMD is received and processed at the application server to affect an outcome of the interactive application. The outcome of the interactive application provides a current state of the interactive application. The interactive application may be a single-user or multi-user application and the server facilitates interaction by a user by instantiating the interactive application identified in the request received from the user and providing content of a virtual scene. The virtual scene may correspond to the current state of the interactive application that is maintained for the user.

In some implementation, a camera 108 either integrated within the computer 106 or mounted externally may be used to capture images of the user while the user is interacting with content provided on the HMD 104. The camera 108 may be communicatively connected to the computer 106 and/or to the HMD 104 to receive signal for capturing the images and to provide the images for further processing. In some implementations, the captured images of the user may be used to influence an outcome of the interactive application.

The operations performed using the system architecture described herein form technical operations requiring one or more servers and/or execution platforms to enable quick access to specific content, to the user. Any number of compression techniques may be engaged by the server to compress the content of the virtual scene prior to transmitting the same to the HMD. The compression techniques may use standard encoders, which would then allow the standard decoders on HMD to access, decode and render the image, video and audio data on the HMD to enable the user to interact with the content. The management of the execution of the interactive application and distribution of content to HMD can involve a number of direction servers, quality-of-service testers or engines, etc. These operations and tasks may utilize special purpose server computers that are designed for streaming and low latency while executing the games remotely and delivering data to the HMD 104 distributed across a wide geography. Although the implementations have been described with reference to HMD 104, the implementations may be extended to other client computing devices, including other wearable devices, mobile computing devices, personal computing devices, etc.

With the general description of the system, specific implementations of the current invention will now be described with reference to the other drawings.

Figure 2:
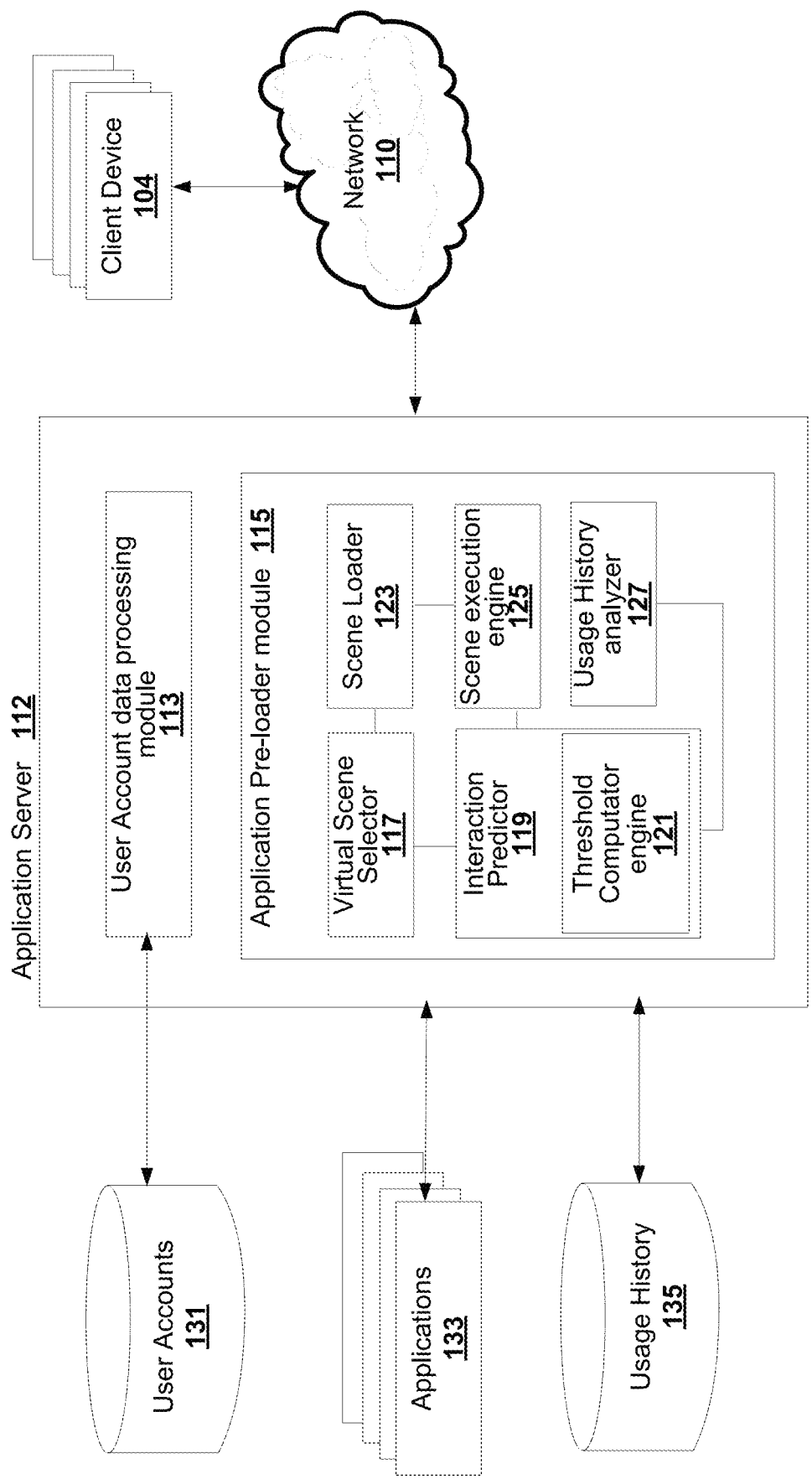
FIG. 2 illustrates an example system architecture that employs an application pre-loader module for identifying, selecting, loading and executing specific virtual scenes of an interactive application, in response to visual cues provided by a user, in accordance to an implementation of the present invention.

FIG. 2 illustrates an example Application Server 112 that engages various application modules to identify, process, validate and provide content to a user, in response to a request for content. The Application Server 112, for example, includes a user account data processing module 113 and an application pre-loader module 115. The user account data processing module 113 is used to validate the request from the user. The validation includes identifying a user identifier of the user that is included in the request and verifying the user identifier against user accounts maintained in a user accounts database 131 on the server 112 to ensure that the request is from a valid user. Upon successful user validation, the request is forwarded to the application pre-loader module 115 for processing. The application pre-loader module 115 is configured to process the request for an interactive application, load, cache, and execute appropriate virtual scenes of the interactive application and provide relevant content of the interactive application to the client device for rendering.

In some implementation, the application pre-loader module 115 may perform further validation of the request prior to providing appropriate content of the interactive application. As part of further validation, an application identifier of the interactive application may be extracted from the request and the extracted identifier may be verified against the applications datastore 133 to, (a) determine if the request is for an application that is available in the applications datastore 133, and (b) determine if the user is authorized to access the application. Upon successful validation of the request, the application pre-loader module (or otherwise referred to as "pre-loader module") 115 processes the request to identify a virtual scene from the interactive application for presenting to the user.

When the user selects the interactive application for the first time, a very first virtual scene of the interactive application is provided to the user. The very first virtual scene may be a virtual "Home" scene that provides options to the user to set up the application for interaction. The options may include customization options, and set up options, to set up the application for user interaction. In addition to the aforementioned options for setting up the application, one or more virtual scenes from the interactive application may also be provided in the Home scene. The one or more virtual scenes may be selected and provided to allow the user to "sample" selective ones of the virtual scenes of the application. During subsequent access of the interactive application, the one or more virtual scenes that may be provided in the Home scene may be the last and/or frequently accessed virtual scenes.

The interactive application may include a plurality of virtual scenes, with each virtual scene having a plurality of visual options to access additional virtual scenes of the interactive application. The visual options provided in each virtual scene are specific to the particular virtual scene and, in some instances, may be specific for the user. The visual options allow the user to access one or more additional virtual scenes within the interactive application.

Figure 3:
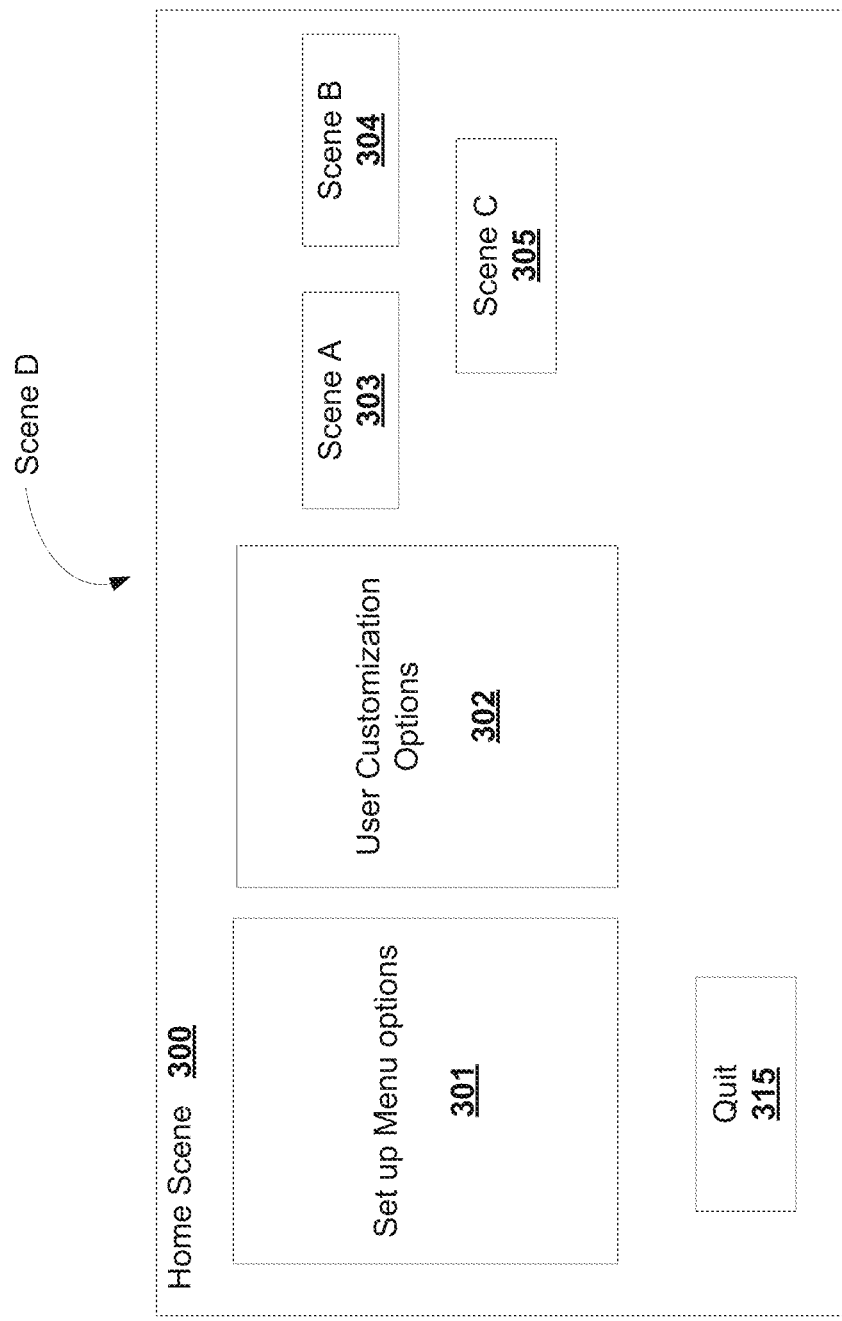
FIG. 3 illustrates a simple block diagram of various options provided on a virtual home scene rendered on a user interface, in one implementation of the present invention.

FIG. 3 illustrates a simplified block diagram of an example virtual "Home" scene 300 that may be provided to the user when the user initially accesses the application for user interaction. The home scene 300 includes a set up menu option 301 to assist the user to initially set up the application for user interaction, a user customization option 302 to allow the user to customize some aspects of the interactive application, such as brightness of content, speed of rendering, clarity level of content, virtual objects used to interact in the virtual scenes, an avatar for representing the user in the interactive application, etc. In addition to the set-up options (301, 302), a "quit" (or exit) option 315 may be provided to quit or exit the interactive session. Additional option(s) 303, 304 and 305 may also be provided to access specific ones of the virtual scenes A, B and C, respectively. The specific ones of the virtual scenes that are provided in the home scene 300 may be consecutive or non-consecutive virtual scenes of the interactive application. For example, in the instance where the user is selecting the application for the first time, the virtual scenes that may be provided in the home scene may include consecutive set of virtual scenes from the beginning of the application, as illustrated in FIG. 3. In the instance where the user has interacted with the application in prior sessions, the options provided in the home scene may be for non-consecutive virtual scenes. For example, the virtual scene options provided in the home scene may include virtual scenes frequently accessed by the user or by other users that are social contacts of the user, application related contacts, other users having similar attributes as the user or other users sharing similar demography, or from same community or geography, etc. In some instances, the home scene may be dynamically adjusted for the user by first including options to access consecutive ones of virtual scenes from the beginning and after one or more interactive sessions, updating the home scene to include some of the favorite or often interacted virtual scenes of the user or of other users. Information related to the user's selection may be maintained in a usage history database 135 and used to populate the home scene for the application during each subsequent interactive session of the user.

Referring back to FIG. 2, user selections at the various options in the home scene are used for setting up and customizing the application and during user interaction. After the initial application set up, a virtual scene selector sub-module 117 of the pre-loader module 115 selects a virtual scene of the application and presents relevant content of the virtual scene for user interaction. If the user had previously interacted with the application, the virtual scene selector 117 may identify a virtual scene based on a current state of the application. For example, the virtual scene selector 117 may interact with usage history database 135 to obtain the current state of the application from the user's previous interactive session and identify the appropriate virtual scene for presenting to the user. The user interaction at the virtual scene is used to drive the progression of the application.

User interactions in the virtual scene of the interactive application are received and processed by an interaction predictor module 119, in substantial real time. The interactions are processed to identify the user's predicted interactions toward one or more visual options provided in the virtual scene, wherein the one or more visual options are used to access additional virtual scenes of the application. The visual options may be in the form of buttons, interactive images of virtual objects, such as a virtual image of a door, a virtual image of an elevator, a virtual image of a set of stairs, etc., or an interactive image of a scene, or a floating menu of options for accessing the different virtual scenes.

Figure 3A:
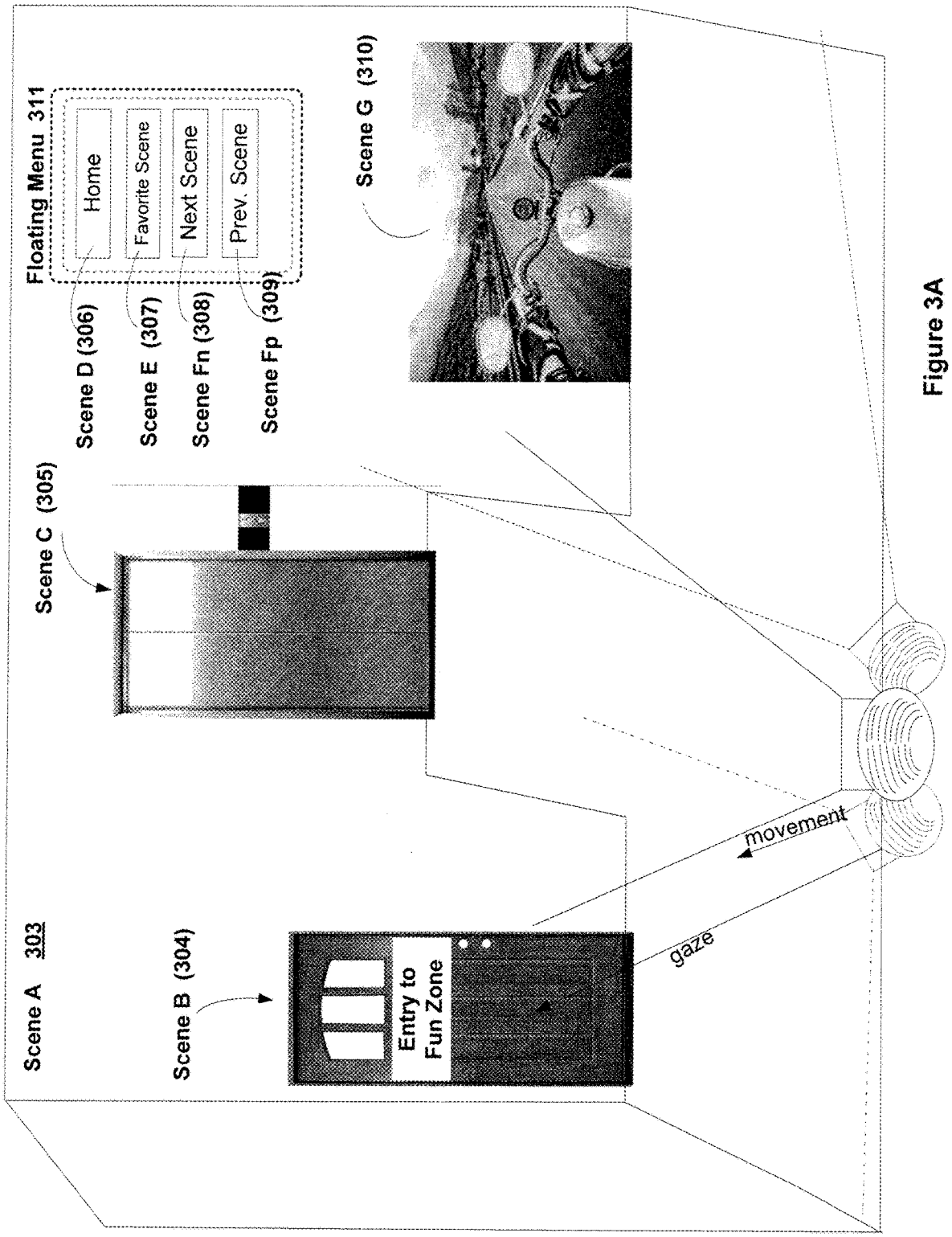
FIGS. 3A-3D illustrate examples of different virtual scenes that can be accessed during the user's interactions in the interactive application, in some implementation of the present invention.

FIGS. 3A-3D illustrate some examples of visual options available in virtual scenes of an interactive application for accessing other virtual scenes. For example, FIG. 3A illustrates a virtual scene, scene A 303, of the interactive application. Scene A may be the first virtual scene of the interactive application after the Home scene and may be provided after the user completes the set-up operation using the options in the Home scene, or the virtual scene may be provided based on a state of the interactive application obtained from the last session of the user, or may be provided in response to an option selected by the user in the Home scene. Scene A includes a plurality of visual options to access the different virtual scenes of the application. The visual options may be distributed within the virtual scene and may be visible based on view frustrum (i.e., field of view). For example, the visual options within the virtual scene may include an image of a virtual door 304 to access virtual scene B, an image of an elevator door 305 to access virtual scene C, an image of a scene 310 to access virtual scene G, and a set of visual options provided in a floating menu 311 to access virtual scenes associated therewith. For example, the floating menu 311 may include interactive visual options to return to the home scene (scene D 306), access a favorite scene (scene E 307), a next scene (scene Fn 308) or a previous scene (scene Fp 309), etc. Of course, the options that are illustrated in FIG. 3A and in the floating menu 311 are mere examples and fewer or more visual options of similar or different types may be provided to allow the user to access the various virtual scenes of the interactive application.

While the user is providing interaction to content of the application rendered on the display of the HMD 104, the interactions are processed to determine predictive interactions with the visual options. The predictive interactions at the various visual options are cumulated over a period of time to determine if the predicted interactions exceed a threshold and whether the threshold of interactions indicate a particular one of the visual option that the user will be selecting imminently. In one implementation, the predictive interactions provided by the user in the virtual scene may include gaze direction, movement of an avatar or user representation of a user within the virtual scene, direction of motion, extension of a hand of the user into the virtual scene that can be determined by tracking a wearable device, a trigger of a controller, etc., or any other cues (i.e., signals) that are indicative of the user's interest toward the different visual options, wherein these interactions are actions provided by the user without actual selection of the visual options. For example, processing the interactivity of the user in the virtual scene of the application may detect the gaze of the user is directed toward the visual option 304 (i.e., virtual image of a door providing access to virtual scene B (e.g., a fun zone)). As part of processing, the interaction predictor module 119 may cumulate the interactivity of the user toward all visual options and use the cumulated interactivity to predict the user's imminent selection of a specific one of the visual options in the virtual scene and pre-load the corresponding virtual scene for user interaction. Details of predicting the user's imminent selection of a specific one of the visual options will be discussed in detail with reference to FIG. 4.

Figure 3B:
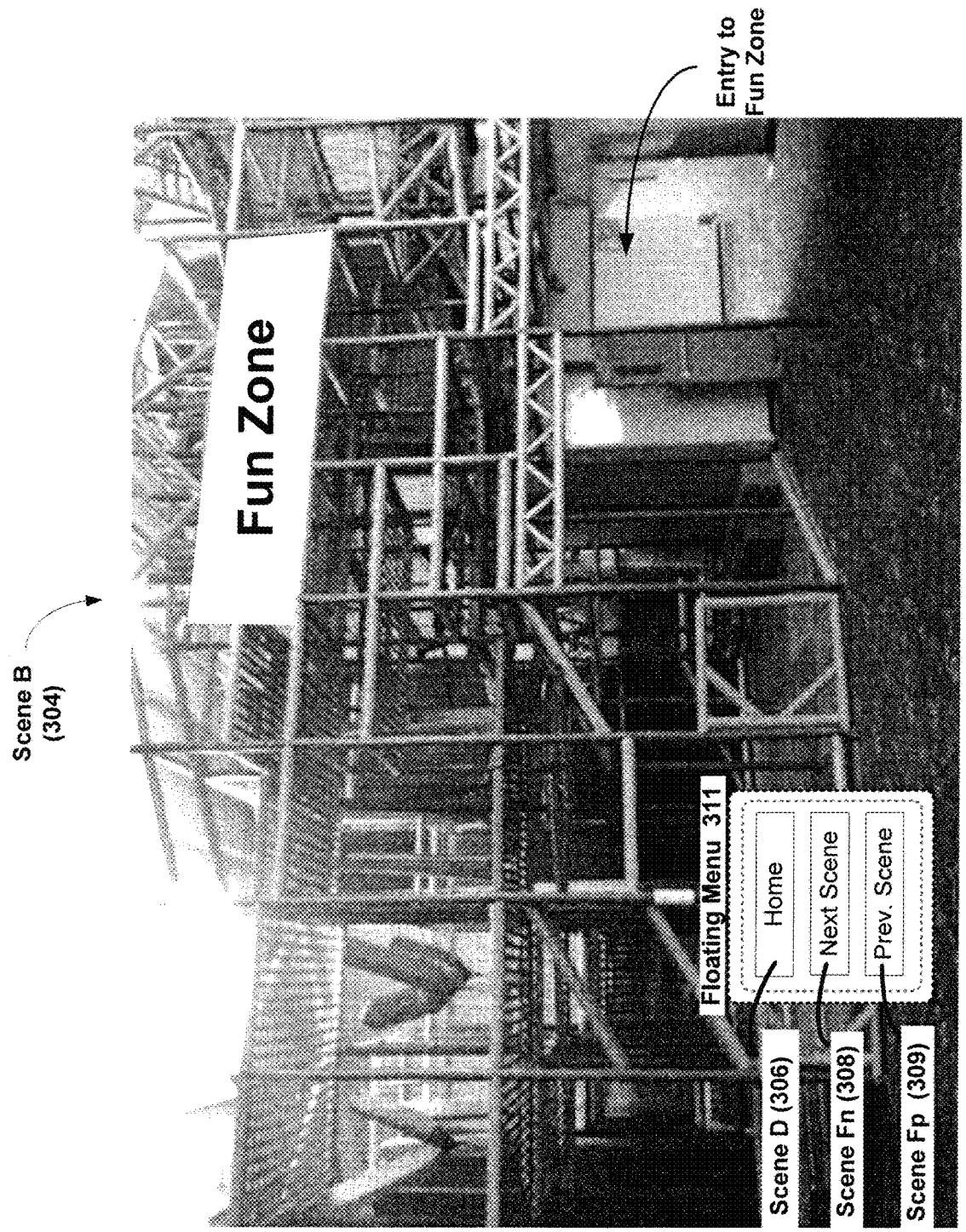

FIG. 3B illustrates one example of a virtual scene associated with the specific one of the visual options that was identified for imminent selection based on the evaluation of the predicted interactions with visual options available in the virtual scene A 303 illustrated in FIG. 3A. In the example illustrated in FIG. 3B, the processing of the predicted interactions identified the imminent selection of the user to be directed toward visual option 304 and the corresponding virtual scene was identified to a fun zone (i.e., virtual scene B). In this example, virtual scene B may be a consecutive or a non-consecutive virtual scene to scene A. The interaction predictor module 119 may continuously process the interactivities of the user while the user is interacting in the virtual scene to identify different actions detected in the user's interactivity in the virtual scene. Based on the processing, the interaction predictor module 119 identifies virtual scene B for pre-loading, caching and keeping ready so as to make the content of scene B available to the user in the event that the user actually selects the visual option 304 for user interaction.

Similarly, a visual option in the form of an image of an elevator 305 may be provided in scene A to access virtual scene C. The elevator option is provided in the virtual scene A based on the context of the virtual scene and based on position or progression of the user in the virtual environment of the interactive application. For example, if the virtual scene currently rendering in scene A is part of a multi-story building, the elevator option 305 may be provided upon detecting the user entering a floor (e.g., ground floor, a lobby) of the multi-story building during his interaction with the virtual content of the application. Access to other levels of the multi-story building may be provided via the elevator option 305 based on the user's interaction with the content of the application that involves the multi-story building. Depending on which floor level the user is detected to be in within the interactive application, the elevator option 305 may provide access to virtual scenes of other floors of the multi-story building. For example, when the user is detected to be in the top floor, the elevator option provides access to lower floor levels of the multi-story building. Similarly, if the user is detected to be in the basement of the multi-story building, then the elevator option may provide access to higher level floors of the multi-story building. In other implementations, instead of the elevator option 305, the user may be provided with stairs option (not shown in FIG. 3A) to access higher or lower levels of the multi-story building.

Figure 3C:
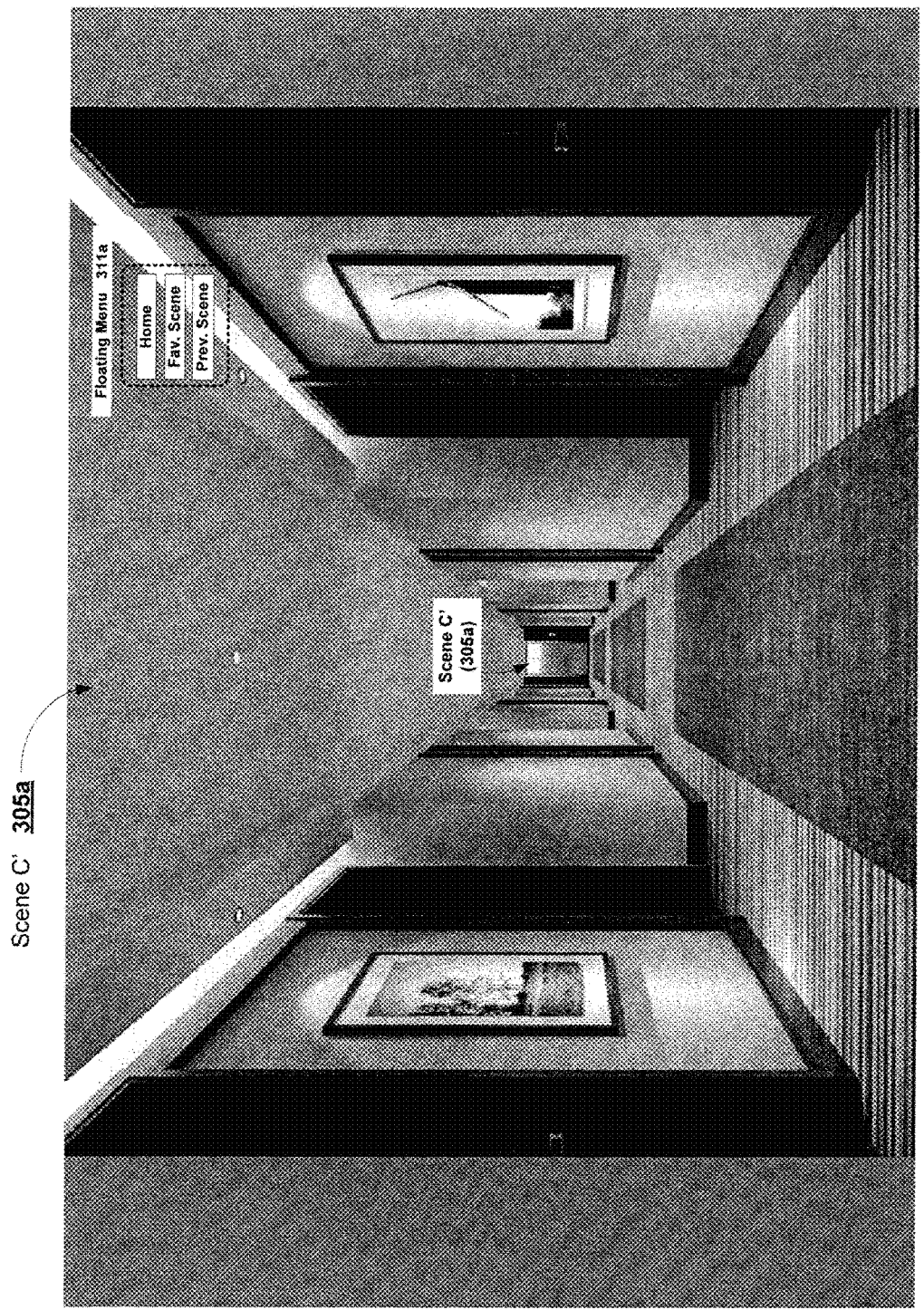

FIG. 3C illustrates an example virtual scene, scene C', of a higher level floor of a hotel building, that is accessed by the user using the visual option 305 (i.e., an image of the elevator) in scene A of FIG. 3A to access higher level floors. The virtual scene, scene C', shows a corridor with doors to access guest rooms on both sides of the corridor. Some of the options (e.g., doors to guest rooms) may not be fully visible from the visual angle illustrated in FIG. 3C. However, content of the virtual scenes associated with the visual options in the virtual scene C' need to be made readily available to the user as and when the user interacts with respective ones of the visual options. As the user interacts with the virtual scene, (e.g., moves his head in the direction of a door to a guest room or moves toward a specific guest room door or extends his hand toward a visual option), the user interactivities are evaluated to determine if the actions are indicative of imminent selection of a visual option within scene C'. The user may or may not be wearing a wearable device that can be tracked. The interaction predictor 119 may track the user's hand using sensors built in the HMD or using sensors that are external to the HMD or by tracking a wearable device worn on the hand of the user. Based on the evaluation of predicted interaction identifying the imminent selection of a visual option, contents of the corresponding virtual scene are pre-loaded for user interaction.

In addition to providing the visual options (e.g., doors to guest rooms or suites) of the virtual scene C' of the higher level floor, one or more additional visual options that are specific to the scene C' are also provided. For example, the virtual scene, scene C', illustrated in FIG. 3C includes an elevator option 305a to access other floor levels (both higher and lower level floors, depending on the number of levels in the building and the current level that the user finds himself in) and a floating menu option 311a that may be used to access the various options provided therein, such as a home option and a favorite scene option. In the example provided in FIG. 3C, the floating menu option 311a is shown to provide fewer options than the one provided in scene A. However, same amount and type of options or fewer or greater number or type of options may be provided in the floating menu 311a.

Figure 3D:
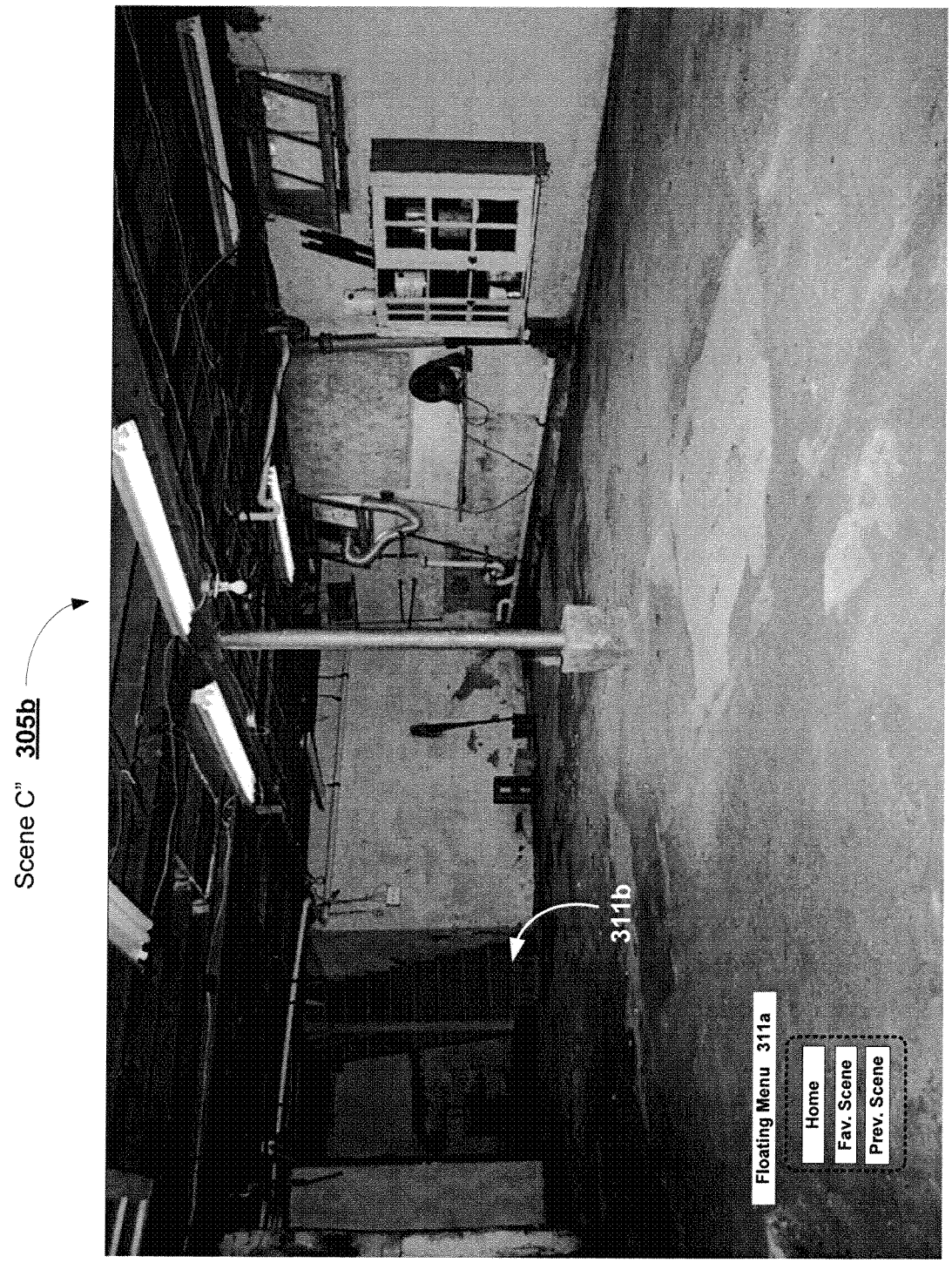

FIG. 3D illustrates another example of a virtual scene, scene C" 305b, that may be accessed using the elevator option 305 provided in scene A of FIG. 3A. The virtual scene, scene C", is of a basement of the multi-story building. (e.g., of a residential apartment complex or a restaurant or hotel or office building), when the user selects the elevator option 305 from the virtual scene A to access a level lower than the lobby. In one example, scene A may be an apartment complex or a restaurant or a hotel or an office building, and the user may have selected the elevator option 305 to go down. Alternately, instead of the elevator option 305, the user may have interacted with a stairs option to go down from a lobby of the multi-story building. The user may also select a visual option (e.g., previous scene, next scene, favorite scene, most challenging scene, etc.,) other than the elevator option 305 or stairs option available within the current virtual scene, scene A 303 to access the basement scene C" 305b. In any case, the user is presented with scene C" 305b—a view of an unfinished basement floor. Other ways for accessing the basement scene C" or any other virtual scene may be based on the progression of the interactive application, skill level of the user, specific winnings or tools available to the user for accessing such virtual scenes. Scene C" provides visual options that are specific to the virtual basement scene depicted therein. For example, the visual option provided in the direction of view presented in FIG. 3D includes a set of stairs 311b to access the higher floor, which might be the ground floor to access the lobby of the building. Since the basement is the lowest part of the building, options to go further down is not provided. Further, since the elevator option 305 was used to access the basement from scene A, the elevator option is also provided (not shown in FIG. 3D) in scene C". In the example illustrated in FIG. 3D, the floating menu option is provided with fewer options than what was provided in FIG. 3A. However, in other examples, the floating menu option may be provided to include additional options to enable the user to access any other virtual scene including a preferred virtual scene outside of the multi-story building. The pre-loader module 115 identifies and pre-loads appropriate virtual scenes of the interactive application in time for the user interaction, wherein the virtual scenes are identified from the request for access to the interactive application or from imminent selection of corresponding visual options.

Details of how the pre-loader module identifies and pre-loads the content of a virtual scene will now be described. The pre-loader module 115 engages a plurality of sub-modules to assist in identifying and pre-loading of various virtual scenes of an interactive application to enable the respective ones of virtual scenes to be fully rendered in time for user interaction when a corresponding visual option is selected by the user. A virtual scene selector 117 of the pre-loader module 115 is used to identify the virtual scene for providing to the user, in response to a request to access the interactive application or in response to a request to access a different virtual scene than a current virtual scene. The virtual scene selector 117 may use information provided in the request to determine which virtual scene to provide to the user. The request may indicate that the user desires to start from the beginning of the interactive application. In such a case, even if the user had selected and interacted with the application during prior sessions and a current state of the interactive application is stored in the usage history data for the interactive application for the user, the virtual screen selector 117 will load the first virtual scene of the interactive application on the server and provide the content of the first virtual scene to the client device for rendering. The first virtual scene may be the initial home scene for setting up the application, as illustrated in FIG. 3, or may be a virtual scene that is immediately after the initial home scene.

Alternately, the virtual scene selector 117 may retrieve a current state of the interactive application from usage history database and provide information related to the virtual scene that pertains to the current state to a scene loader 123 for loading. If no history exists, the interactive application is started from the beginning.

The scene loader 123 uses the virtual scene information provided by the scene selector 117 to query the application within the applications datastore 133 and obtain the content of the virtual scene. The content obtained for the virtual scene includes code and data that is required to execute the virtual scene. The content of the virtual scene is loaded and cached in memory in the application server, and a signal is sent to the scene execution engine 125 to execute the code to enable rendering of the virtual scene for user interaction. Content from the virtual scene is forwarded to the HMD 104 over the network 110 using appropriate APIs, for rendering. As part of content, one or more visual options that are specific for the context of the virtual scene are also retrieved and provided to the HMD for rendering.

User interactions at the virtual scene are tracked and are used to affect progression in the application. The interaction predictor 119 continuously processes the user interactivities in the virtual scene of the application to determine the user's actions that is indicative of the user's interest in specific visual option in the virtual scene. Each action identifies an interactive indicator. For example, as the user interacts with the content of the virtual scene, the user's action of moving his head in a particular direction may be used to identify a gaze indicator. Similarly, the user action of moving toward a particular object (e.g., visual option) within the virtual scene may be used to identify a movement indicator, etc. Each of these indicators identified based on the user's interaction in the virtual scene may be accorded different weights. In some implementations, different weights may be accorded to each interactive indicator based on temporal attributes, location attributes, etc. For example, the gaze indicator may be accorded different weights based on amount of time the user's gaze was continued in the particular direction. As a result, if the user's gaze continues in the particular direction for a longer period of time, the weight accorded to the gaze indicator may be progressively increased to correspond with the amount of time the user gazes in the particular gaze direction. Similarly, if the user moves within the virtual scene, the movement indicator in a particular direction may be accorded different weight based on the user continuing to move in the particular direction and based on proximity to a visual option. The closer the user gets to the visual option, the greater the weight accorded to the movement indicator.

Figure 4:
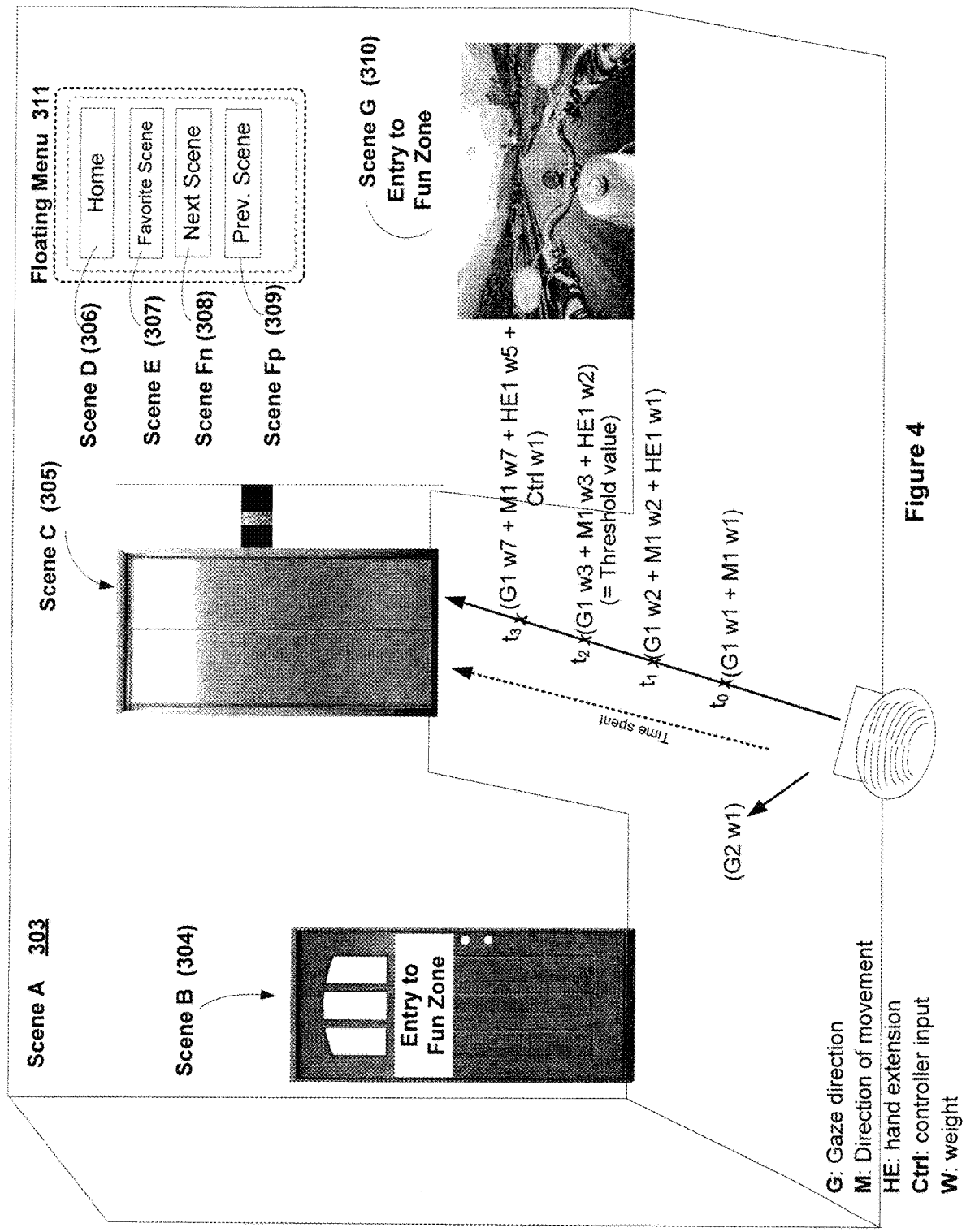
FIG. 4 illustrates an example of interaction prediction computed by processing user interactivity in the virtual scene of FIG. 3A, in one implementation of the present invention.

FIG. 4 illustrates on example, wherein the interaction predictor module 119 monitors the user's interactivity within the virtual scene of FIG. 3A over time and evaluates the interactive indicators identified from the user's interactivity to predict the user's imminent selection of a visual option for pre-loading a corresponding virtual scene for user interaction. The interaction predictor 119 evaluates the interactive indicators identified from the various actions of the user. It then accords different action weights for the different interactive indicators based on the actions of the user detected during the user's interactivity in the virtual scene over time. The interaction predictor 119 then determines when the interactive indicators approach a threshold that represents imminent selection of a particular visual option in the virtual scene, wherein the particular visual option is associated with a second virtual scene. It should be noted that each visual option in the virtual scene is associated with and provides access to a distinct virtual scene of the application. For example, referring to FIG. 4, which depicts the virtual scene of FIG. 3A, a visual option 304 provides access to Scene B, visual option 305 provides access to Scene C, visual option 306 provides access to Scene D, visual option 307 provides access to Scene E, and so on.

The imminent selection, in some implementations, is computed by cumulating action weights associated with each of the plurality of interactive indicators to determine when the cumulative action weights approach a threshold that determines the user's imminent selection of a visual option in the virtual scene. The interaction predictor module 119 may engage a threshold computator engine 121 to accumulate the various interactive indicators identified by the interaction predictor module 119 and determine when the accumulated interactive indicators approach the threshold. As shown in FIG. 4, the interaction predictor module 119 detects that at time $t_0$ the user's gaze direction is directed toward visual option 305 (image of the elevator) in the virtual scene A 303, for example. Further, the interaction predictor module 119 may detect the user moving toward the visual option 305. This information is provided to the threshold computator engine 121 which generates a cumulative representation of the interactive indicators. As a result, the cumulative interactive indicators generated by the threshold computator engine 121, for time $t_0$ is represented as (G1 w1+M w1), wherein G1 represents gaze interactivity in direction 1 (i.e., toward visual option 305), w1 is the weight accorded to the gaze interactivity at time $t_0$ and M1 is the movement interactivity in direction 1. At time $t_1$, the interaction predictor module 119 detects that the user's interactivity that includes gaze activity and movement activity continues to be directed toward visual option 305. Further, at time $t_1$, the user has extended his hand in direction 1 that points toward the of the visual option 305. As a result, at time $t_1$, cumulative interactive indicators generated by the threshold computator engine 121 is represented as (G1 w2+M1 w2+HE1 w1), wherein HE1 represents the hand extension activity in direction 1 and w2 is the weight accorded to the various activities at time $t_1$. The weight accorded to each interactive indicator may be based on what time the respective one of the interactive indicators was identified during the user's interactivity with the virtual scene. Since both gaze and movement interactivities were identified at time $t_0$, both of the interactive indicators are accorded the same weight, w1, for time $t_0$.

It should be noted that although each interactive indicator is accorded the same weight at each time, they are provided as mere examples. More or less weight may be accorded to different interactive indicators for each cumulative time period that is being evaluated. For example, the weight accorded to gaze indicator may be greater than the weight accorded to the movement indicator or vice versa. The interaction predictor 119, therefore, may identify and adjust the action weights of each interactive indicator identified from the user interactivity in the virtual scene in accordance to some predefined rules. The interaction predictor module 119 continues to evaluate the interactive indicators during the user's interaction with the virtual scene. Based on the evaluation, at time $t_2$, the cumulative interactive indicators generated by the threshold computator engine 121 may be represented as (G1 w3+M1 w3+HE1 w2), wherein w3 is the weight accorded to the gaze and movement indicators as each of these indicators remain in direction 1 at time t3. Since the hand extension indicator was detected at a later time than the gaze and movement indicators, the weight accorded to the hand extension indicator is noted to be different. In some implementation, the weight accorded to the hand extension indicator when it was initially detected may be same as when the gaze and/or movement indicators were initially detected.

In addition to computing the cumulative value of interactive indicators, the threshold computator engine 121 compares the cumulative action weights to determine if the cumulative action weights of the various interactive indicators approach a pre-defined threshold. Based on the evaluation, it may be determined that the cumulative actions weights of the various interactive indicators may have reached the pre-defined threshold value at time t2, indicating that the user's imminent selection is visual option 305. In response, the threshold computator engine 121 sends a signal to the interaction predictor 119 to indicate that visual option 305 was a target of imminent selection by the user, in FIG. 4. Accordingly, a second virtual scene associated with the visual option 305 is selected, loaded, cached and kept ready to enable the pre-loader module to execute the code of the second virtual scene when the visual option 305 is selected by the user, to enable full rendering of the second virtual scene for user interaction. Thus, based on the evaluation, the various virtual scenes associated with the different visual options available in the virtual scene that the user is interacting with, are kept at various states of readiness in order to provide timely access to the corresponding virtual scenes for the user. The various states of readiness, for example, may include selection, loading, caching and executing. The aforementioned states are just examples and fewer or greater number of states may be considered.

Since the virtual scene, scene A of FIG. 3A, is currently accessed for user interaction, scene A is in the "executing" state. As noted, scene A provides various visual options to access a plurality of virtual scenes (e.g., scenes B, C, D, E, F, and G). As a result, each of the plurality of virtual scenes is in a "selected" state. Based on the evaluation of the interactive indicators detected during user interaction at the virtual scene A, state of each of the plurality of virtual scenes that can be accessed from the virtual scene A, is dynamically updated. The evaluation of the interactive indicators and the cumulation of actions weights associated with the detected interactive indicators are used to generate a probability graph. The probability graph provides a visual representation of the states of the various virtual scenes that can be accessed from virtual scene A, wherein the states are dynamically adjusted over time to match the changing interest expressed by the user via cues that are directed toward the various visual options.

Figure 5A:
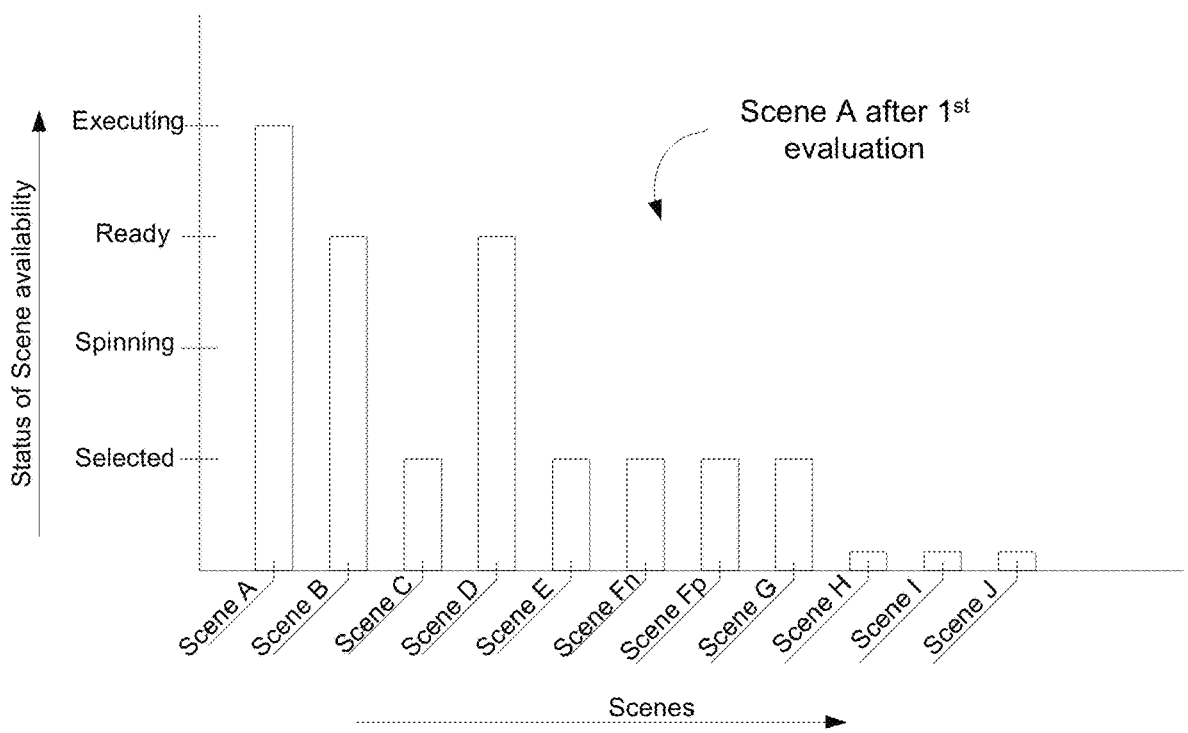
FIGS. 5A-5D illustrate examples of probability graph that are dynamically adjusted over time based on cues detected from the user at various visual options provided in the initial virtual scene of FIG. 3A, in some implementations of the present invention.

FIGS. 5A-5F illustrate examples of probability graphs that were plotted based on evaluation of the cues provided by the user toward different visual options available in Scene A of FIG. 3A. FIG. 5A illustrates the probability graph after the visual cues of the virtual scene A were first evaluated. The probability of selection of a visual option associated with scene A of the interactive application is highest as scene A has already been selected and is currently executing to provide content for user interaction. Additionally, the virtual scenes that can be directly accessed from scene A through various visual options are set to be at least in a selected state. The selected state indicates that any one of the virtual scenes can be accessed at any time by the user by interacting with a visual option provided in virtual scene A. Thus, virtual scenes B, C, D E, Fn, Fp and G are at least in a selected state. Additionally, virtual scenes H, I and J are shown to have low probability scores as there are no visual options provided in Scene A to directly access these virtual scenes. These virtual scenes may be accessible through other virtual scenes or can be accessed through other means, such as tools or options available to the user.

Further, it is noted that the user's imminent selection is directed toward visual option 304 associated with virtual scene B (e.g., the fun zone virtual scene). Based on the first evaluation, the interaction predictor 119 provides information related to the virtual scene associated with visual option 304 to the virtual scene selector 117. The virtual scene selector 117 identifies the virtual scene, scene B, associated with the visual option 304 and provides this information to the scene loader 123 to identify an instance of scene B and pre-load the code for scene B into memory and cache it to get the virtual scene B ready. Scene B is now set at "ready" state.

In addition to evaluating the user's interactive indicators at the virtual scene A, the interaction predictor 119 may signal the usage history analyzer 127 module to query the usage history database 135 of the user in order to determine any virtual scenes that the user is favored to interact with when the user is in virtual scene A. Based on the query, the usage history analyzer 127 may identify visual option 306 associated with scene D from the floating menu 311 that the user usually interacts with when the user is in virtual scene A.

Information provided by the usage history analyzer 127 is also provided to the virtual scene selector 117, which forwards information related to scene D to the scene loader 123, so that the scene loader 123 can identify an instance of scene D and pre-load the code for scene D into memory, cache it and get the virtual scene D ready. As a result, in addition to virtual Scene B, virtual Scene D is also kept in ready state. Therefore, after first evaluation, virtual scene A is in executing state and virtual scenes B and D are in ready state while virtual scenes C, E, Fn, Fp and G are in selected state.

Figure 5B:
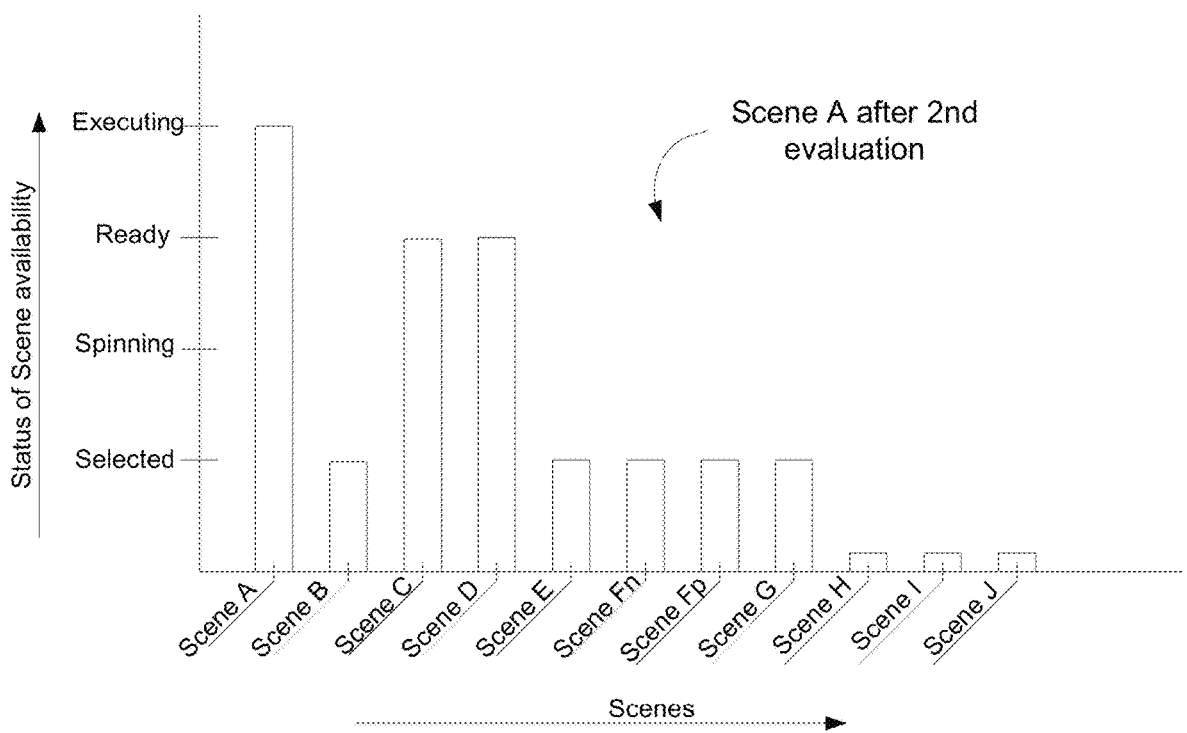

FIG. 5B illustrates the probability graph for scene A after second evaluation of visual cues. During the second evaluation, the interaction predictor 119 detects a shift in the user's interest expressed via interactive indicators, from visual option 304 associated with scene B to visual option 305 associated with Scene C. For example, the shift is identified in FIG. 4 as G2 and is accorded a weight w1. Although, in the example, illustrated in FIG. 4, the gaze is shown to shift from visual option 305 to visual option 304, the same type of shift may be detected from visual option 304 to visual option 305. As a result, the probability graph is adjusted to indicate a downward shift in cumulative score for scene B and an upward shift in cumulative score for Scene C. The cumulative score for Scene A and Scene D continues to be at the same level as shown in FIG. 5B. The shift in the user's interest detected during the second evaluation causes an adjustment to the state of the virtual scenes B and C. In some implementation, the adjustment to the states cause the code and data of scene B to be unloaded from memory thereby causing scene B to be downgraded from ready state to selected state and simultaneous uploading of the code and data of scene C into memory thereby causing scene C to be elevated from selected state to ready state. Although such adjustments may seem like the contents of different virtual scenes are loaded into and unloaded from memory frequently based on the evaluation of interactive indicators, the frequency of such adjustments are low as each evaluation extends over a time period defined in the pre-defined threshold. The time period defined in the pre-defined threshold ensures that the evaluation captures the user's extended interest at the various visual options and does not capture fleeting interests of the user. It also ensures that the processing resources of the system are used optimally as only the necessary code and data are being loaded into memory at appropriate times while the unwanted code and data are purged from memory.

Figure 5C:
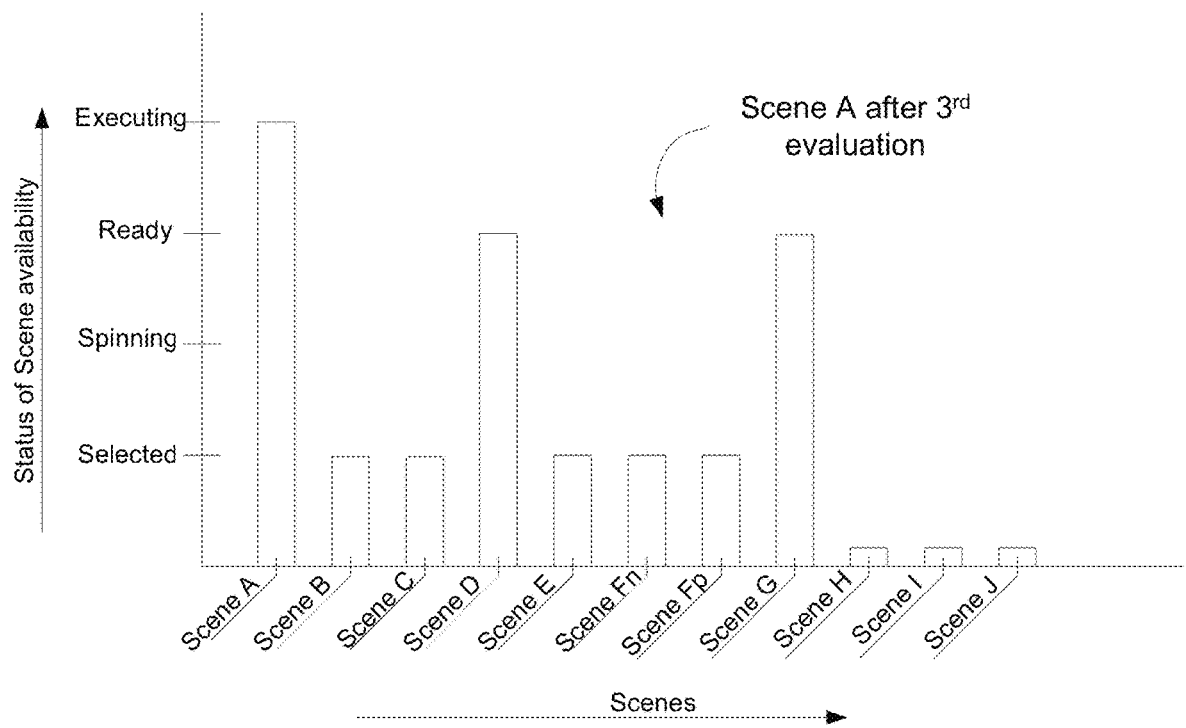

FIG. 5C illustrates the probability graph when the user is interacting with content from scene A, after third evaluation. In this illustration, the user's cue is now directed at visual option 310 associated with scene G and not at visual option 305 associated with scene C. As a result, the computed cumulative score for scene G increases and the cumulative score of scene C decreases. Due to the shift in the computed cumulative score of Scenes G and C, the respective states of scene G and scene C are dynamically adjusted in the probability graph to show that virtual scene G is now loaded and ready while virtual scene C is unloaded from memory and is in a selected state.

Figure 5D:
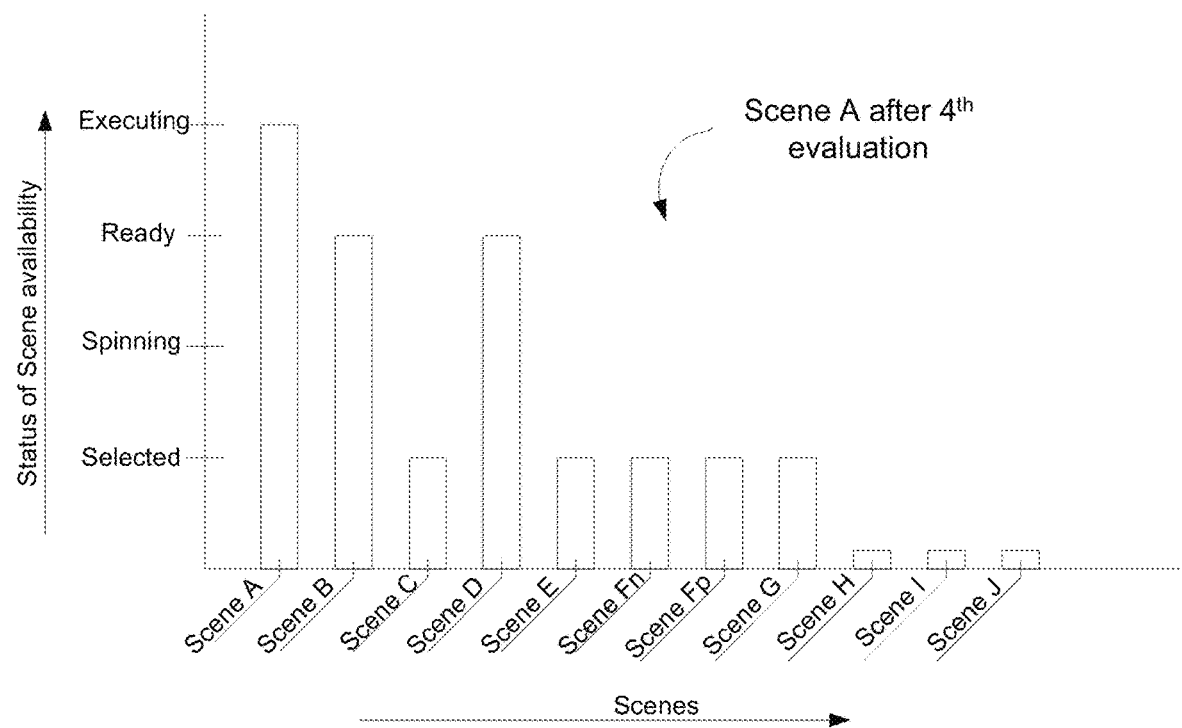

Continuing to monitor the user's cues at various visual options while the user is interacting with content of virtual scene A may result in an adjustment to the cumulative score, and consequently to the status of the various virtual scenes associated with the respective ones of the visual options. FIG. 5D illustrates the status of the various virtual scenes that can be accessed from virtual scene A after fourth evaluation, based on the computed cumulative score of the various visual indicators detected during user interactivity in virtual scene A. The probability graph after the fourth evaluation illustrated in FIG. 5D is similar to the probability graph after the first evaluation illustrated in FIG. 5A. The status of the virtual scenes identifies the various states of readiness for access.

Figure 5E:
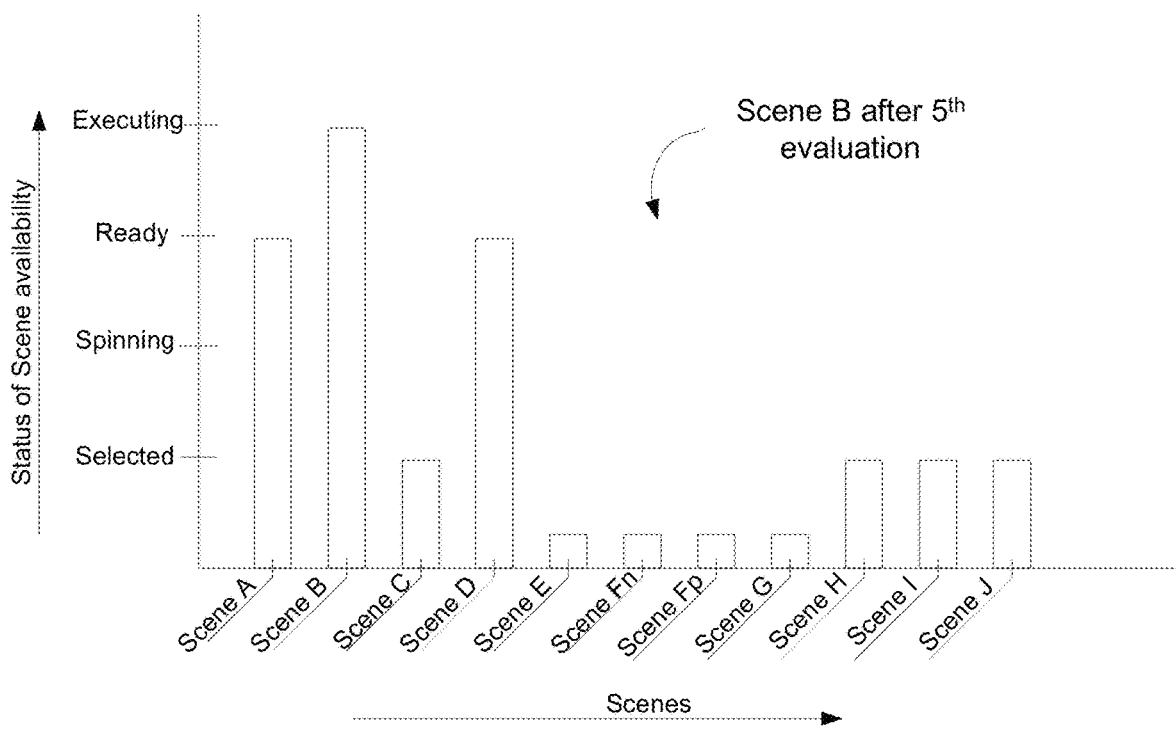
FIGS. 5E-5F illustrate examples of probability graph that are adjusted over time based on cues detected from the user at various visual options provided in a subsequent virtual scene (e.g., scene B) that the user has navigated to during interaction with the interactive application, in some implementations of the present invention.

FIG. 5E illustrates the probability graph after fifth evaluation. After the fifth evaluation, it is determined that the user has accessed virtual scene B by selecting visual option 304 in scene A. As a result, in accordance to the fifth evaluation, the cumulative score of virtual scene A goes down and the cumulative score of virtual scene B goes up, causing the status of scene A to be downgraded from "executing" state to "ready" state and status of virtual scene B to be elevated from "ready" state to "executing" state. Virtual scene A may be maintained in ready state for a pre-defined period of time or till the user progresses further into the interactive application or if it is determined from the usage history that the user's frequency of accessing the visual option associated with virtual scene A from virtual scene B is high. If, on the other hand, the user's frequency of accessing the visual option associated with virtual scene A from virtual scene B is low then the status of virtual scene A may be downgraded from "executing" state to "selected" state.

In addition to maintaining the user's selection of certain ones of the virtual scenes in the usage history, the usage history may also maintain usage selection for different users. The usage history of different users can be obtained for a virtual scene of the interactive application and used for preparing certain ones of the virtual scenes for user interaction. For example, the user may be accessing the interactive application for the first time and does not have any usage history for the interactive application. Consequently, the usage history of the different users may be used to get the various virtual scenes at various stages of readiness for the user.

As the user progresses from one virtual scene to another within the application, the user may not be able to access certain ones of the previously accessed virtual scenes. This may be due to a lack of direct links (i.e., visual options) from the current virtual scene to certain ones of the previously accessed virtual scenes, wherein the previously accessed virtual scenes are non-consecutive. As a result, the cumulative scores of such virtual scenes drops down and status of such virtual scenes, during access of the current virtual scene, is set to "unavailable", for example, as shown for virtual scenes H-J in the probability graphs of FIGS. 5A-5D. The virtual scenes that are set to unavailable may be maintained in memory or unloaded from memory to make room for other virtual scenes.

In alternate implementation, virtual scene B may provide access via visual options to certain ones of virtual scenes (e.g., virtual scenes H-J) that were not previously accessible from virtual scene A. As a result, these virtual scenes (i.e., virtual scenes H-J) are shown to be in "selected" state. Similarly, virtual scene B may not provide access to certain other ones of the virtual scenes that were accessible from virtual scene A. As a result, those virtual scenes (e.g., virtual scenes E, Fn, Fp and G) are either unloaded or set to "unavailable" state, as illustrated in FIG. 5E.

Figure 5F:
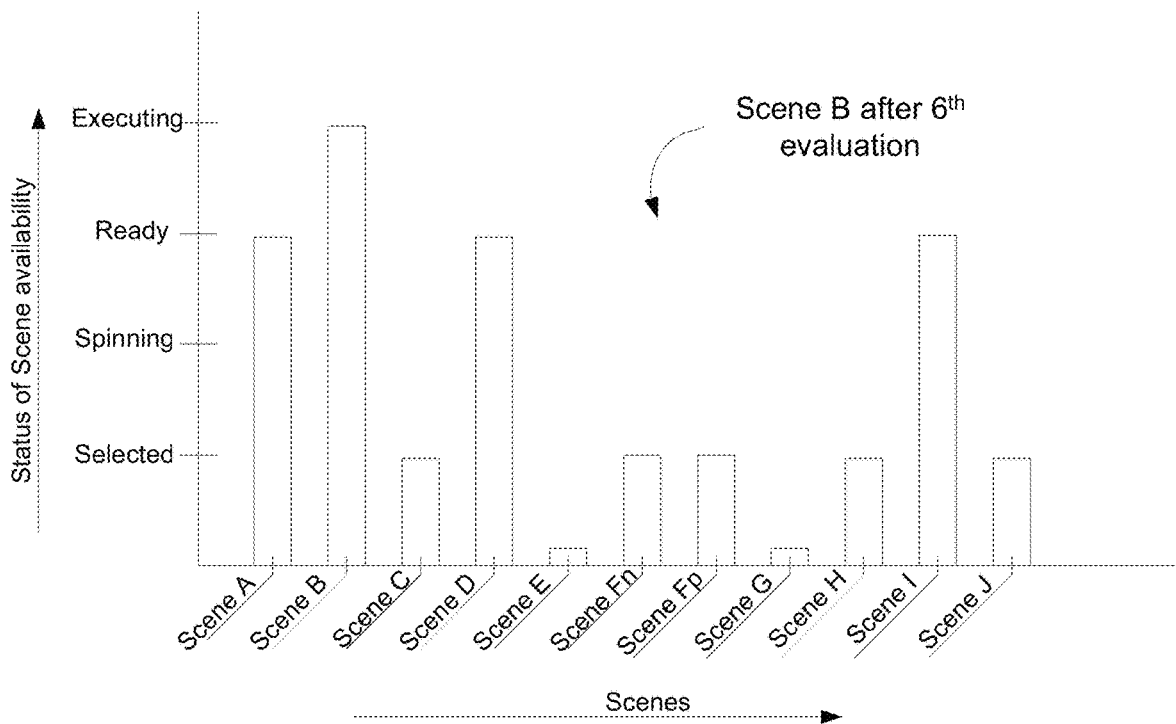

FIG. 5F illustrates an example probability graph of user after sixth evaluation. As illustrated, the user continues to access virtual scene B. As a result, virtual scene B is shown to be executing. Please note that virtual scene B discussed with reference to FIG. 5F is slightly different from the virtual scene B of FIG. 3B as the virtual scene B of FIG. 5F is indicated to include additional visual options that are not shown in FIG. 3B. Based on the frequency at which certain ones of the virtual scenes are accessed by the user from virtual scene B, cumulative score computed for virtual scenes A and D are high. As a result virtual scenes A and D are shown to be loaded and in "ready" state. Based on the visual options available in virtual scene B, virtual scenes C, Fn, Fp, H and J are shown to be in "selected" state. Further, based on the evaluation of interactive indicators detected from user interactivity in the virtual scene B, cumulative score of virtual scene I is computed to be high, and virtual scene I is loaded and set to "ready" state. Thus, the cumulative scores of the various virtual scenes that can be accessed from a current virtual scene are dynamically computed and the states of the virtual scenes are adjusted in accordance to the computed cumulative score. Thus, when the user selects a virtual option to access a particular virtual scene, the particular virtual scene is ready and loaded for execution and the content made available to the user without delay. This allows the system to load only the necessary code and data of certain ones of the virtual scenes needed for a current time and to not load the code and data of certain other ones of the virtual scenes that are not needed at the current time.

Figure 6A:
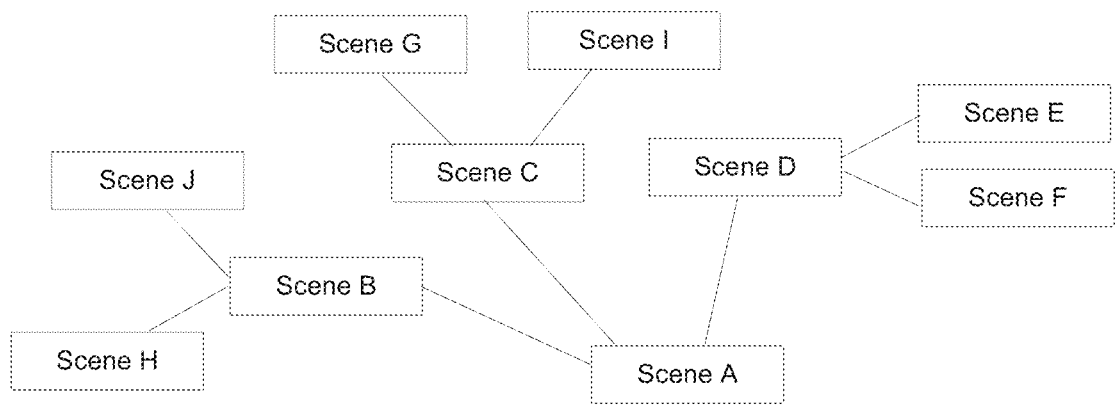
FIGS. 6A-6B illustrate the mapping of the various scenes of the interactive application, in some implementations of the invention.
Figure 6B:
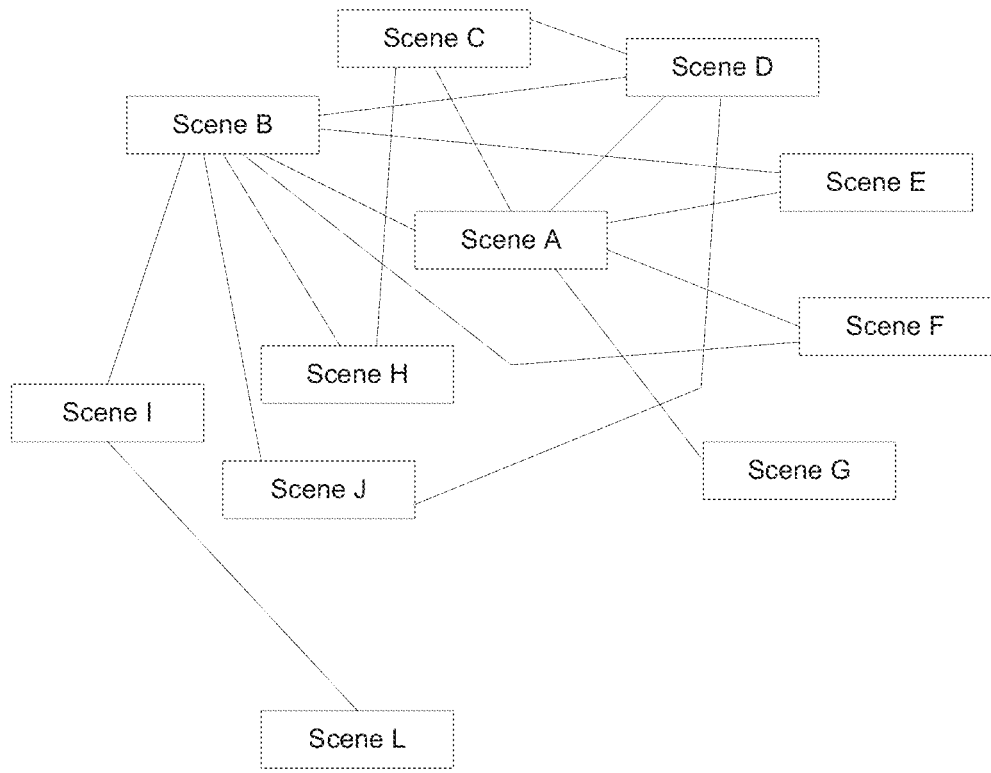

FIGS. 6A and 6B illustrate examples of various links in virtual scenes of an application, in some implementations. An application may include a plurality of virtual scenes with each successive virtual scene being accessed using visual options provided in the previous virtual scene or based on current state of the application. FIG. 6A illustrates a simplified linkage graph of the various virtual scenes of an application in which access to consecutive virtual scenes are provided from a current virtual scene, in one implementation. For example, virtual scenes B, C and D can be accessed from virtual scene A and vice versa. Virtual scenes J and H can be accessed from virtual scene B and vice versa, virtual scenes G and I can be accessed from virtual scene C and vice versa, and virtual scenes E and F can be accessed from virtual scene D and vice versa, respectively.

FIG. 6B, on the other hand, illustrates a more inter-related linkage graph of various virtual scenes of an application, in an alternate implementation. In this implementation, the various virtual scenes can be accessed from one or more virtual scenes that are consecutive or non-consecutive, in addition to having access to successive or previous virtual scenes. For example, virtual scene A provides access to virtual scenes B, C, D, E, F and G and each of these virtual scenes provide access to virtual scene A. Virtual scene B provides access to virtual scenes A, D, E, F, H, I and J, which provide access to virtual scene B. Virtual scene C provides access to virtual scenes A, D and H, which provide access to virtual scene C. Virtual scene D provides access to virtual scene A, B, C and J. Virtual scenes E and F each provide access to virtual scenes A and B. Virtual scene I provides access to virtual scene L and vice versa. As the user progresses through the various virtual scenes and moves farther and farther away from a particular virtual scene, direct access to the particular virtual scene becomes more limited or non-existent. In such scenarios, the particular virtual scene is accessed via visual options, such as buttons, image of objects, image of scenes, floating menus, etc., available in a current virtual scene that the user is in. The visual options allow the user to jump from one virtual scene to another consecutive or non-consecutive virtual scene. In order to ensure that the user is provided with content from different virtual scenes at times when the user selects visual options associated with the different virtual scenes, the pre-loader module proactively evaluates the interactive indicators and pre-loads the appropriate content in time. Based on such proactive evaluation, system resources are preserved while the user experience is not compromised.

Figure 7A:
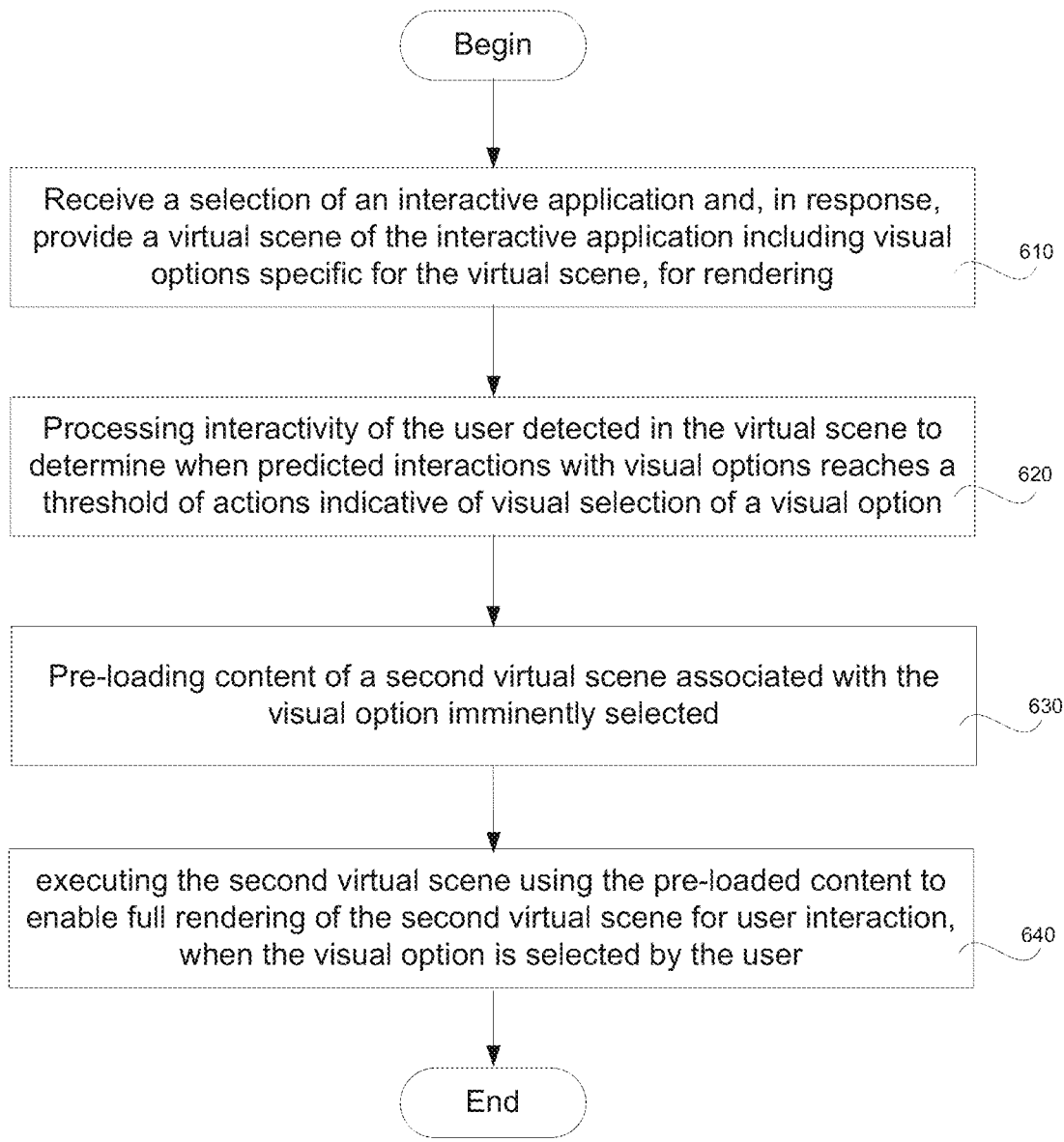
FIG. 7A-7B illustrates process operations of methods that are used to pre-load a virtual scene of an interactive application, in accordance with different implementations of the invention.

FIG. 7A illustrates the various method operations used for pre-loading a virtual scene of an interactive application, in one implementation. The method begins at operation 610, when a selection of an interactive application is received at a server. The interactive application may include a plurality of virtual scenes, with each successive virtual scene accessed through natural progression of the interactive application or through a visual option provided in a virtual scene. In response to the selection of the interactive application, content of a virtual scene of the interactive application is identified and provided for rendering at a head mounted display. The code and data for executing the virtual scene is uploaded, cached, executed, and the content from the execution is provided for rendering. User interactivity at the virtual scene is processed to identify predicted interactions with the visual options in the virtual scene. The processing continues till a threshold of actions that is indicative of imminent selection of one of the visual options, is reached, as illustrated in operation 620. Evaluating of the interactive indicators includes computing cumulative score for weighted actions at each of the visual options to determine a likelihood of selection of a specific one of the visual options in the virtual scene by the user.

A second virtual scene of the interactive application associated with the visual option that was identified for imminent selection, is pre-loaded, based on the evaluation, as illustrated in operation 630. The second virtual scene is executed using the pre-loaded content so that the user has access to the content of the second virtual scene, when the user selects the visual option associated with the second virtual scene, as illustrated in operation 640. The pre-loading of the second virtual scene includes loading visual options that are specific to the second virtual scene to allow the user to interact with the visual options to select additional virtual scenes. The process of evaluating the cues and pre-loading of appropriate virtual scenes continues as the user continues to interact with the virtual scene and as the user progresses through the various virtual scenes of the interactive application during a current session.

Figure 7B:
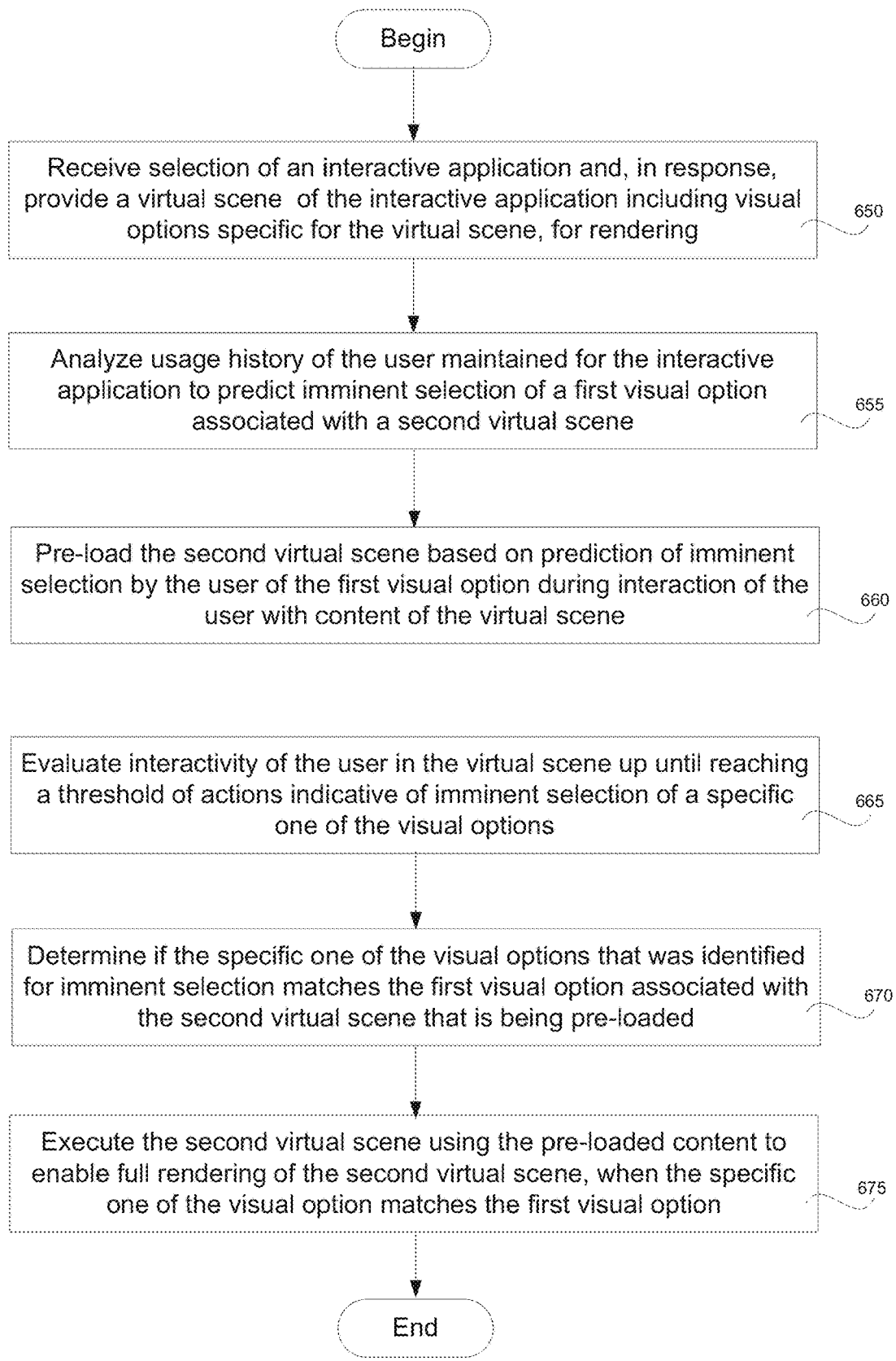

FIG. 7B illustrates the various method operations used for pre-loading a virtual scene of an interactive application, in an alternate implementation. The method begins at operation 650, when a selection of an interactive application is received at a server. The interactive application includes a plurality of virtual scenes, with each virtual scene accessed either through a natural progression of the interactive application or through a visual option provided in a virtual scene. In response to the selection of the interactive application, the content of a virtual scene of the interactive application is identified and provided for rendering on a head mounted display worn by a user providing the selection. The content includes visual options for accessing additional virtual scenes of the application.

Upon providing the virtual scene, a usage history of the user maintained for the application is analyzed to identify a second virtual scene for pre-loading, as illustrated in operation 655. The usage history maintains the user's prior interactive sessions of the application that identifies all of the virtual scenes accessed by the user and the modes (e.g., natural progression or selection of visual option) by which the virtual scenes were selected. Based on the analysis, the second virtual scene associated with a specific visual option in the virtual scene that was not previously selected by the user during prior interactive session, may be identified. There may be more than one visual option in the virtual scene that may not have been selected by the user and the analysis may identify the second virtual scene associated with the specific visual option based on the sequence of selection of the various visual options followed by the user during current or prior interactive sessions or may be based on sequence of selection of visual options followed by a plurality of users or may be selected randomly from the unselected visual options. The plurality of users may be social contacts of the user, or may be identified based on one or more attributes associated with the user. Alternately, based on the analysis, a visual option within the virtual scene that was frequently accessed by the user may be identified and the second virtual scene associated with the frequently accessed visual option is identified.

The code and data for executing the second virtual scene is pre-loaded based on prediction of imminent selection of a first visual option associated with the second virtual scene during current interaction of the user with the content of the virtual scene, as illustrated in operation 660. Interactivity of the user in the virtual scene is evaluated up until action weights accorded to each of the plurality of interactive indicators detected during user interaction with the virtual scene, reaches a threshold of actions weights, as illustrated in operation 665, for a specific one of the visual options. The cumulative score computed for the interactive indicators is indicative of the user's expressed interest in a specific one of the visual options. The specific one of the visual options that was identified for imminent selection is compared with the first visual option associated with the virtual scene that was pre-loaded to determine if there is match of the visual option, as illustrated in operation 670.

Based on the determination, the second virtual scene that was pre-loaded, is executed using the pre-loaded content to enable full rendering of the second virtual scene for user interaction, when the first visual option is selected by the user, as illustrated in operation 675. The loading of the second virtual scene includes loading visual options that are specific to the second virtual scene to allow the user to interact with the visual options in the second virtual scene to access additional virtual scenes. The process of evaluating the cues and loading of appropriate virtual scenes continues as the user interacts with the virtual scene and as the user progresses through the various virtual scenes of the interactive application during a current session.

The various implementations described herein includes detecting the user's expressed interest in a specific one of the virtual scenes using the interactive indicators detected during the user's interaction with a virtual scene of an interactive application, and pre-loading the specific virtual scene in advance, in anticipation that the user will select the visual option associated with the specific virtual scene that has been pre-loaded for user interaction. A user's interest towards an object, for example, can usually be gauged in advance of the user actually selecting the object by simply observing and evaluating certain interactive indicators of the user that are directed toward the object. For example, a user may express his interest on the object without selecting the object, by merely gazing in the direction of the object or moving toward or in the direction of the object, or extending a hand into the virtual scene, controller triggers, etc. Such indicators can be evaluated to gauge the user's interest in the object. In the various implementations discussed herein, based on the indicators detected from the user interaction in the virtual scene, a specific virtual scene associated with a particular visual option is pre-loaded, cached and kept ready, so that in the event the user actually selects the visual option for accessing the specific virtual scene, the specific virtual scene is already executed so that access to the content of the virtual scene can be provided to the user in a timely manner without the user having to wait and without unnecessarily burdening the computing resources of the system. Other advantages of the various implementations will become apparent to one skilled in the art.

Figure 8:
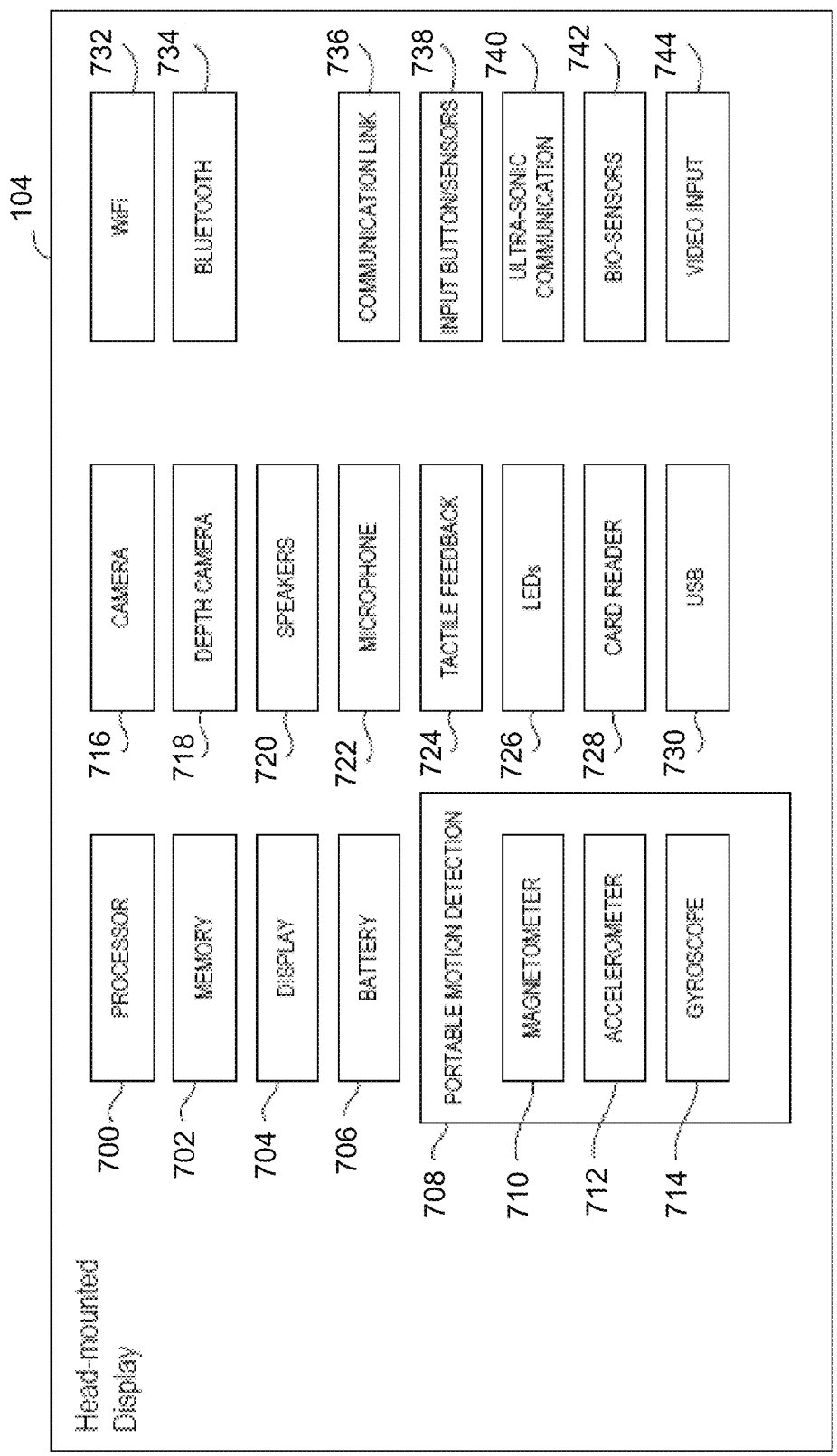
FIG. 8 illustrates components of a head mounted display that is used to receive content from various virtual scenes, in accordance with an alternate implementation of the invention.

With reference to FIG. 8, a diagram illustrating components of a head-mounted display 104 is shown, in accordance with an embodiment of the invention. The head-mounted display 104 includes a processor 700 for executing program instructions. A memory 702 is provided for storage purposes, and may include both volatile and non-volatile memory. A display 704 is included which provides a visual interface that a user may view. A battery 706 is provided as a power source for the head-mounted display 104. A motion detection module 708 may include any of various kinds of motion sensitive hardware, such as a magnetometer 710, an accelerometer 712, and a gyroscope 714.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 712 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 710 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 712 is used together with magnetometer 710 to obtain the inclination and azimuth of the head-mounted display 104.

A gyroscope is a device for measuring or maintaining orientation, based on the principles of angular momentum. In one embodiment, three gyroscopes 714 provide information about movement across the respective axis (x, y and z) based on inertial sensing. The gyroscopes help in detecting fast rotations. However, the gyroscopes can drift over time without the existence of an absolute reference. This requires resetting the gyroscopes periodically, which can be done using other available information, such as positional/orientation determination based on visual tracking of an object, accelerometer, magnetometer, etc.

A camera 716 is provided for capturing images and image streams of a real environment. More than one camera may be included in the head-mounted display 104, including a camera that is rear-facing (directed away from a user when the user is viewing the display of the head-mounted display 104), and a camera that is front-facing (directed towards the user when the user is viewing the display of the head-mounted display 104). Additionally, a depth camera 718 may be included in the head-mounted display 104 for sensing depth information of objects in a real environment.

The head-mounted display 104 includes speakers 720 for providing audio output. Also, a microphone 722 may be included for capturing audio from the real environment, including sounds from the ambient environment, speech made by the user, etc. The head-mounted display 104 includes tactile feedback module 724 for providing tactile feedback to the user. In one embodiment, the tactile feedback module 724 is capable of causing movement and/or vibration of the head-mounted display 104 so as to provide tactile feedback to the user.

LEDs 726 are provided as visual indicators of statuses of the head-mounted display 104. For example, an LED may indicate battery level, power on, etc. A card reader 728 is provided to enable the head-mounted display 104 to read and write information to and from a memory card. A USB interface 730 is included as one example of an interface for enabling connection of peripheral devices, or connection to other devices, such as other portable devices, computers, etc. In various embodiments of the head-mounted display 104, any of various kinds of interfaces may be included to enable greater connectivity of the head-mounted display 104.

A WiFi module 732 is included for enabling connection to the Internet via wireless networking technologies. Also, the head-mounted display 104 includes a Bluetooth module 734 for enabling wireless connection to other devices. A communications link 736 may also be included for connection to other devices. In one embodiment, the communications link 736 utilizes infrared transmission for wireless communication. In other embodiments, the communications link 736 may utilize any of various wireless or wired transmission protocols for communication with other devices.

Input buttons/sensors 738 are included to provide an input interface for the user. Any of various kinds of input interfaces may be included, such as buttons, touchpad, joystick, trackball, etc. An ultra-sonic communication module 740 may be included in head-mounted display 104 for facilitating communication with other devices via ultra-sonic technologies.

Bio-sensors 742 are included to enable detection of physiological data from a user. In one embodiment, the bio-sensors 742 include one or more dry electrodes for detecting bio-electric signals of the user through the user's skin.

The foregoing components of head-mounted display 104 have been described as merely exemplary components that may be included in head-mounted display 104. In various embodiments of the invention, the head-mounted display 104 may or may not include some of the various aforementioned components. Embodiments of the head-mounted display 104 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

Figure 9:
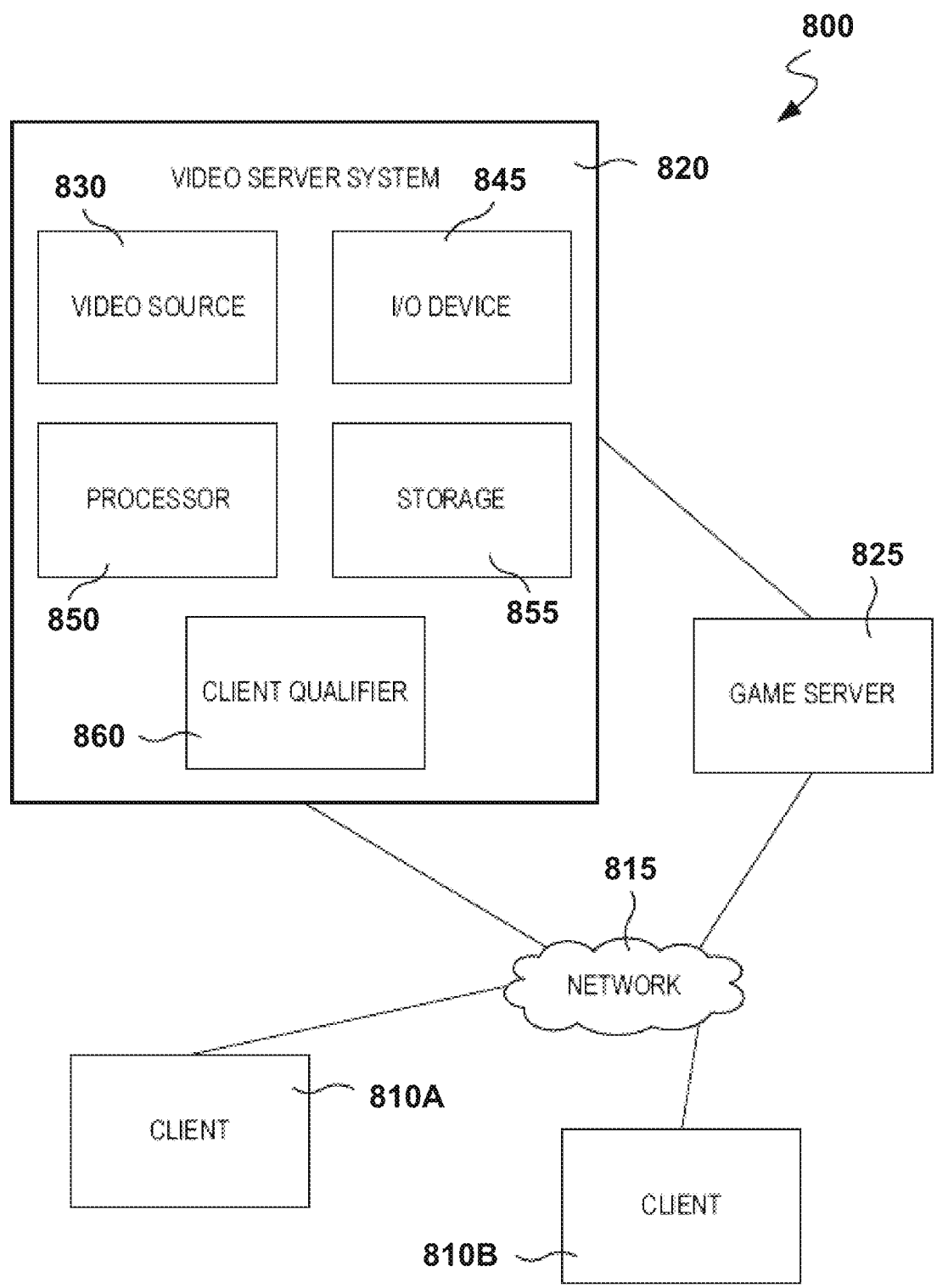
FIG. 9 illustrates a simplified block diagram of an example interactive application system, such as a Game System, in accordance with various implementations of the present invention.

FIG. 9 is a block diagram of a Game System 800, according to various embodiments of the invention. Game System 800 is configured to provide a video stream to one or more Clients 810 via a Network 815. The Network is similar to the Network 110 illustrated in FIG. 2. Game System 800 typically includes a Video Server System 820 and an optional game server 825. Video Server System 820 is configured to provide the video stream to the one or more Clients 810 with a minimal quality of service. For example, Video Server System 820 may receive a game command that changes the state of or a point of view within a video game, and provide Clients 810 with an updated video stream reflecting this change instantly with minimal lag time. The Video Server System 820 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 820 frames per second. Although higher or lower frame rates are included in alternative embodiments of the invention.

Clients 810, referred to herein individually as 810A, 810B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 810 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 810 or on a separate device such as a monitor or television. Clients 810 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 810 are optionally geographically dispersed. The number of clients included in Game System 800 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 820 to deliver a game viewed through the HMD. In one embodiment, the game console receives the video stream from the video server system 820, and the game console forwards the video stream, or updates to the video stream, to the HMD for rendering.

Clients 810 are configured to receive video streams via Network 815. Network 815 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 810 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 810 may, but are not required to, further include systems configured for modifying received video. For example, a client may be configured to perform further rendering, to overlay one video image on another video image, to crop a video image, and/or the like. For example, Clients 810 may be configured to receive various types of video frames, such as I-frames, P-frames and B-frames, and to process these frames into images for display to a user. In some embodiments, a member of Clients 810 is configured to perform further rendering, shading, conversion to 3-D, or like operations on the video stream. A member of Clients 810 is optionally configured to receive more than one audio or video stream. Input devices of Clients 810 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 810 is generated and provided by Video Server System 820. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 810 are typically configured to receive inputs from a user. These inputs may include game commands configured to change the state of the video game or otherwise affect game play. The game commands can be received using input devices and/or may be automatically generated by computing instructions executing on Clients 810. The received game commands are communicated from Clients 810 via Network 815 to Video Server System 820 and/or Game Server 825. For example, in some embodiments, the game commands are communicated to Game Server 825 via Video Server System 820. In some embodiments, separate copies of the game commands are communicated from Clients 810 to Game Server 825 and Video Server System 820. The communication of game commands is optionally dependent on the identity of the command. Game commands are optionally communicated from Client 810A through a different route or communication channel that that used to provide audio or video streams to Client 810A.

Game Server 825 is optionally operated by a different entity than Video Server System 820. For example, Game Server 825 may be operated by the publisher of a multi-player game. In this example, Video Server System 820 is optionally viewed as a client by Game Server 825 and optionally configured to appear from the point of view of Game Server 825 to be a prior art client executing a prior art game engine. Communication between Video Server System 820 and Game Server 825 optionally occurs via Network 815. As such, Game Server 825 can be a prior art multiplayer game server that sends game state information to multiple clients, one of which is game server system 820. Video Server System 820 may be configured to communicate with multiple instances of Game Server 825 at the same time. For example, Video Server System 820 can be configured to provide a plurality of different video games to different users. Each of these different video games may be supported by a different Game Server 825 and/or published by different entities. In some embodiments, several geographically distributed instances of Video Server System 820 are configured to provide game video to a plurality of different users. Each of these instances of Video Server System 820 may be in communication with the same instance of Game Server 825. Communication between Video Server System 820 and one or more Game Server 825 optionally occurs via a dedicated communication channel. For example, Video Server System 820 may be connected to Game Server 825 via a high bandwidth channel that is dedicated to communication between these two systems.

Video Server System 820 comprises at least a Video Source 830, an I/O Device 845, a Processor 850, and non-transitory Storage 855. Video Server System 820 may include one computing device or be distributed among a plurality of computing devices. These computing devices are optionally connected via a communications system such as a local area network.

Video Source 830 is configured to provide a video stream, e.g., streaming video or a series of video frames that form a moving picture. In some embodiments, Video Source 830 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 825. Game Server 825 may maintain a copy of the state of the game based on game commands received from multiple players using geographically disperse clients. In these cases, the game state is provided by Game Server 825 to Video Source 830, wherein a copy of the game state is stored and rendering is performed. Game Server 825 may receive game commands directly from Clients 810 via Network 815, and/or may receive game commands via Video Server System 820.

Video Source 830 typically includes rendering logic, e.g., hardware, firmware, and/or software stored on a computer readable medium such as Storage 855. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 810. For example, the raw video may be encoded according to an Adobe Flash® standard, .wav, H.264, H.263, On2, VP6, VC-1, WMA, Huffyuv, Lagarith, MPG-x, XVID™, FFmpeg, x264, VP6-8, RealVideo™, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and an "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 830 includes a video recording device such as a camera. This camera may be used to generate delayed or live video that can be included in the video stream of a computer game. The resulting video stream optionally includes both rendered images and images recorded using a still or video camera. Video Source 830 may also include storage devices configured to store previously recorded video to be included in a video stream. Video Source 830 may also include motion or positioning sensing devices configured to detect motion or position of an object, e.g., person, and logic configured to determine a game state or produce video-based on the detected motion and/or position.

Video Source 830 is optionally configured to provide overlays configured to be placed on other video. For example, these overlays may include a command interface, log in instructions, messages to a game player, images of other game players, video feeds of other game players (e.g., webcam video). In embodiments of Client 810A including a touch screen interface or a gaze detection interface, the overlay may include a virtual keyboard, joystick, touch pad, and/or the like. In one example of an overlay a player's voice is overlaid on an audio stream. Video Source 830 optionally further includes one or more audio sources.

In embodiments wherein Video Server System 820 is configured to maintain the game state based on input from more than one player, each player may have a different point of view comprising a position and direction of view. Video Source 830 is optionally configured to provide a separate video stream for each player based on their point of view. Further, Video Source 830 may be configured to provide a different frame size, frame data size, and/or encoding to each of Client 810. Video Source 830 is optionally configured to provide 3-D video.

I/O Device 845 is configured for Video Server System 820 to send and/or receive information such as video, commands, requests for information, a game state, gaze information, device motion, device location, user motion, client identities, player identities, game commands, security information, audio, and/or the like. I/O Device 845 typically includes communication hardware such as a network card or modem. I/O Device 845 is configured to communicate with Game Server 825, Network 815, and/or Clients 810.

Processor 850 is configured to execute logic, e.g. software, included within the various components of Video Server System 820 discussed herein. For example, Processor 850 may be programmed with software instructions in order to perform the functions of Video Source 830, Game Server 825, and/or a Client Qualifier 860. Video Server System 820 optionally includes more than one instance of Processor 850. Processor 850 may also be programmed with software instructions in order to execute commands received by Video Server System 820, or to coordinate the operation of the various elements of Game System 800 discussed herein. Processor 850 may include one or more hardware device. Processor 850 is an electronic processor.

Storage 855 includes non-transitory analog and/or digital storage devices. For example, Storage 855 may include an analog storage device configured to store video frames. Storage 855 may include a computer readable digital storage, e.g. a hard drive, an optical drive, or solid state storage. Storage 815 is configured (e.g. by way of an appropriate data structure or file system) to store video frames, artificial frames, a video stream including both video frames and artificial frames, audio frame, an audio stream, and/or the like. Storage 855 is optionally distributed among a plurality of devices. In some embodiments, Storage 855 is configured to store the software components of Video Source 830 discussed elsewhere herein. These components may be stored in a format ready to be provisioned when needed.

Video Server System 820 optionally further comprises Client Qualifier 860. Client Qualifier 860 is configured for remotely determining the capabilities of a client, such as Clients 810A or 810B. These capabilities can include both the capabilities of Client 810A itself as well as the capabilities of one or more communication channels between Client 810A and Video Server System 820. For example, Client Qualifier 860 may be configured to test a communication channel through Network 815.

Client Qualifier 860 can determine (e.g., discover) the capabilities of Client 810A manually or automatically. Manual determination includes communicating with a user of Client 810A and asking the user to provide capabilities. For example, in some embodiments, Client Qualifier 860 is configured to display images, text, and/or the like within a browser of Client 810A. In one embodiment, Client 810A is an HMD that includes a browser. In another embodiment, client 810A is a game console having a browser, which may be displayed on the HMD. The displayed objects request that the user enter information such as operating system, processor, video decoder type, type of network connection, display resolution, etc. of Client 810A. The information entered by the user is communicated back to Client Qualifier 860.

Automatic determination may occur, for example, by execution of an agent on Client 810A and/or by sending test video to Client 810A. The agent may comprise computing instructions, such as JavaScript™, embedded in a web page or installed as an add-on. The agent is optionally provided by Client Qualifier 860. In various embodiments, the agent can find out processing power of Client 810A, decoding and display capabilities of Client 810A, lag time reliability and bandwidth of communication channels between Client 810A and Video Server System 820, a display type of Client 810A, firewalls present on Client 810A, hardware of Client 810A, software executing on Client 810A, registry entries within Client 810A, and/or the like.

Client Qualifier 860 includes hardware, firmware, and/or software stored on a computer readable medium. Client Qualifier 860 is optionally disposed on a computing device separate from one or more other elements of Video Server System 820. For example, in some embodiments, Client Qualifier 860 is configured to determine the characteristics of communication channels between Clients 810 and more than one instance of Video Server System 820. In these embodiments the information discovered by Client Qualifier can be used to determine which instance of Video Server System 820 is best suited for delivery of streaming video to one of Clients 810.

Figure 10:
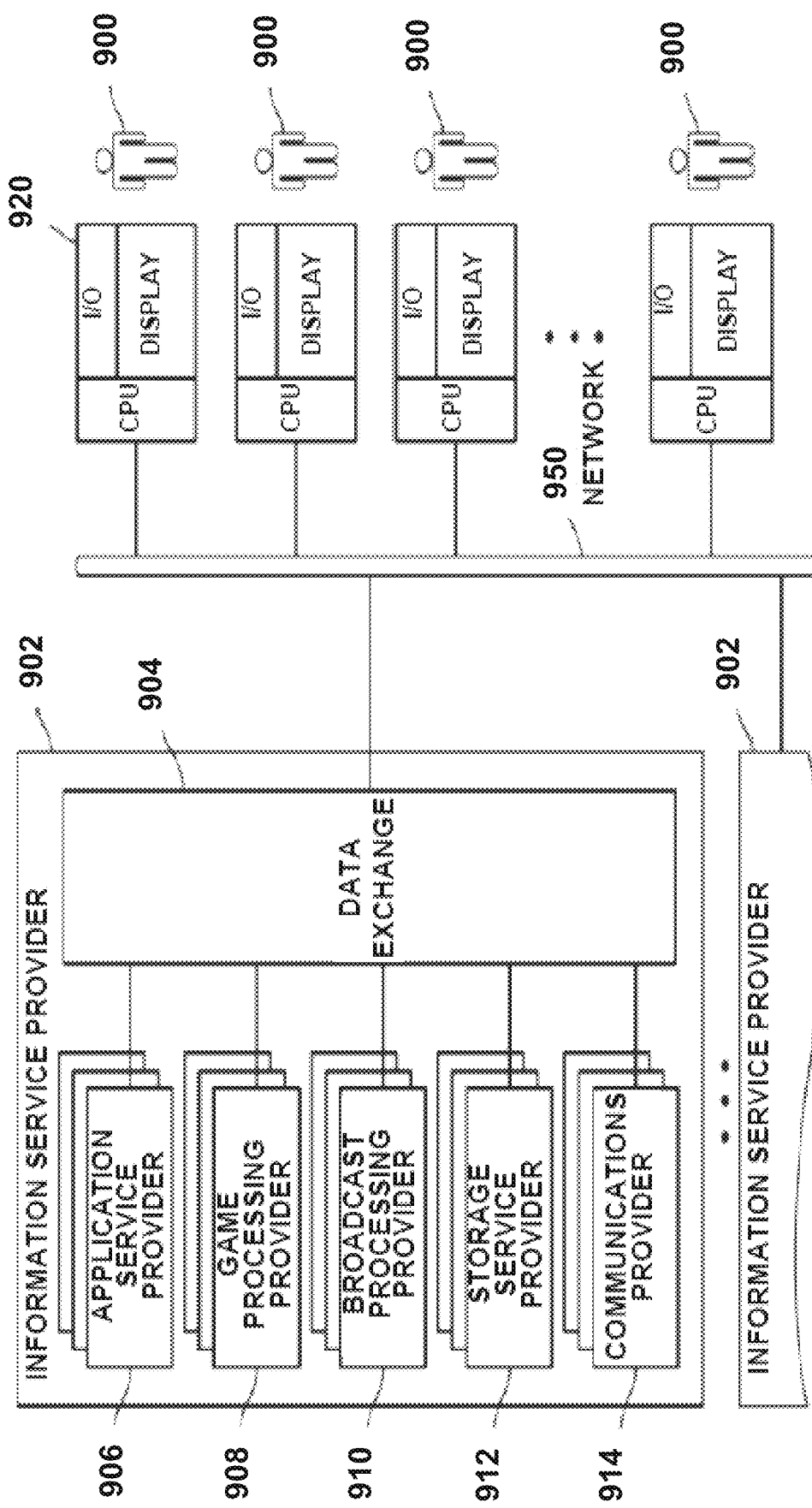
FIG. 10 illustrates an exemplary Information Service Provider architecture for delivering informational content and services to users who are geographically dispersed and connected via network, in accordance with one implementation of the present invention.

FIG. 10 illustrates an implementation of an Information Service Provider architecture that may be used in providing access to different games. Information Service Providers (ISP) 902 deliver a multitude of information services to users 900 geographically dispersed and connected via network 950. Network 950 may be similar to network 110 of FIG. 1 or FIG. 2. Although the various implementations have been discussed with reference to providing fast access to games, the implementations can be extended to provide faster access to other interactive applications, such as virtual tours, etc., that provide content that can include various levels of content that can be accessed using one or more visual cues or other tools or application points or awards or rewards obtained by the user during interaction with the interactive applications. For example, an ISP 902 can deliver just one type of service, such as a game, or a variety of services such as games, stock price updates, broadcast media, news, sports, gaming, etc. Additionally, the services offered by each ISP may be dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data from the user's gaming or access profile to the new ISP through a connection module, such that the user information "follows" the user to the new city making the data closer to the user and easier to access. In another implementation, a master-server relationship may be established between a master ISP, which manages the information for the user, and a server ISP that interfaces directly with the user under control from the master ISP. In another implementation, the data is transferred from one ISP to another ISP (i.e., during switching of data center assigned to the user) as the client moves around the world and such transfer may be based on a compatibility of services provided by the respective ISPs to make the ISP 902 in better position to service the user be the one that delivers these services.

ISP 902 includes Application Service Provider (ASP) 906, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on a vendor's system, for example, and is accessed by users through a web browser using HTML, or by a special purpose client software provided by the vendor, or via other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 902 includes a Game Processing Server or Provider (GaPS) 908 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another implementation, the GaPS establishes communication between the players and their respective game-playing devices exchange information without relying on the centralized GaPS.

Dedicated GaPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server or Provider (BPS) 910 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 912 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 914 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 904 interconnects the several modules inside ISP 902 and connects these modules to client devices 920 of users 900 via network 950. Data Exchange 904 can cover a small area where all the modules of ISP 902 are in close proximity, or can cover a large geographic area when the different modules are geographically dispersed. For example, Data Exchange 904 can include a fast Gigabit Ethernet (or faster) within a cabinet of a data center, or an intercontinental virtual area network (VLAN).

Users 900 access the remote services with respective client devices 920, which includes at least a CPU, a memory (not shown), a display and I/O. The client device can be a PC, a mobile phone, a netbook, tablet, gaming system, a PDA, etc. In one implementation, ISP 1070 recognizes the type of device used by the client and adjusts the communication method employed. In other cases, client devices use a standard communications method, such as HTML, to access ISP 1070.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. Alternately, the computer readable code may be downloaded from a server using the data exchange interconnects described above. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present implementations are to be considered as illustrative and not restrictive, and the invention is not to be limited to the details given herein, but may be modified within the scope and equivalents of the described implementations.

An exemplary overall system architecture of a gaming console is described herein. An example gaming console may include a Sony® Playstation 3® (PS3) or a Playstation 4® (PS4) entertainment device, which may be compatible with controllers for implementing an embodiment of the present invention. Although the PS3 gaming console system architecture is explained in detail, it should be noted that the various implementations described herein can be extended to system architecture of a different gaming console or computing device. A system unit is provided, with various peripheral devices connectable to the system unit. The system unit is similar to the cloud gaming system 300 of FIG. 1. The system unit comprises: a processor, which may be a 8 core processor, as in PS3, or a multi-core processor, as in PS4; a Rambus® dynamic random access memory (XDRAM) unit, as in PS3, or a graphics dynamic random access memory, such as a GDDR5, as in PS4; a Reality Synthesizer graphics unit (e.g., 550 MHz GPU) with a dedicated video random access memory (VRAM) unit, as in PS3, or 800 or 900 MHz GPU with shared graphics memory in PS4 and PS4 Pro; and an I/O bridge. The system unit also comprises a Blu-Ray® Disk Read Only Memory (BD-ROW)) (optical) disk reader for reading from a disk and a removable slot-in hard disk drive (HDD), accessible through the I/O bridge. Optionally the system unit also comprises a memory card reader for reading compact flash memory cards, Memory Stick® memory cards and the like, which is similarly accessible through the I/O bridge and in PS4, a built-in DVR to record games.

The I/O bridge also connects to six Universal Serial Bus (USB) 2.0 ports; a gigabit Ethernet port; an IEEE 802.11b/g wireless network (Wi-Fi) port; and a Bluetooth® wireless link port capable of supporting of up to seven Bluetooth® connections.

In operation the I/O bridge handles all wireless, USB and Ethernet data, including data from one or more game controllers (DualShock 3® controller, as in PS3, or a PS4 DualShock 4® controller, as in PS4, etc.). For example when a user is playing a game, the I/O bridge receives data from the game controller via a Bluetooth® link and directs it to the processor (in PS3) or multi-core processor (in PS4), which updates the current state of the game accordingly. Further, other image and move sensors provide data captured during game play of the user, to the I/O bridge, which directs it to the respective processor. The game controllers (e.g., game controllers of PS4) include a share button option for sharing a game, a clickable touchpad, a rechargeable battery (lithium-ion or other type), etc.

The wireless, USB and Ethernet ports also provide connectivity for other peripheral devices in addition to game controllers, such as: a remote control; a keyboard; a mouse; a portable entertainment device such as a Sony Playstation Portable® entertainment device; a video camera such as an EyeToy® video camera; a microphone headset; and a removable hard drive. Such peripheral devices may therefore in principle be connected to the system unit wirelessly; for example the portable entertainment device may communicate via a Wi-Fi ad-hoc connection, whilst the microphone headset may communicate via a Bluetooth® link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader may be connected to the system unit via a USB port, enabling the reading of memory cards of the kind used by the Playstation® or Playstation 2® devices.

In the present implementation, the game controller is operable to communicate wirelessly with the system unit via the Bluetooth® link. However, the game controller can instead be connected to a USB port, thereby also providing power by which to charge the battery of the game controller. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control is also operable to communicate wirelessly with the system unit via a Bluetooth link. The remote control comprises controls suitable for the operation of the Blu-Ray™ Disk BD-ROM reader and for the navigation of disk content.

The Blu-Ray™ Disk BD-ROM reader is operable to read Compact Disc, read only memory (CD-ROMs) compatible with the PlayStation™ and PlayStation 2™ devices, in addition to conventional pre-recorded and recordable compact discs (CDs), and so-called Super Audio CDs. The Blu-Ray™ Disk BD-ROM reader is also operable to read Digital versatile disc-read only memory (DVD-ROMs) compatible with the Playstation 2™ and PlayStation 3™ devices, in addition to conventional pre-recorded and recordable DVDs. The Blu-Ray™ Disk BD-ROM reader is further operable to read BD-ROMs compatible with the PlayStation 3™ device, as well as conventional pre-recorded and recordable Blu-Ray Disks.

The system unit is operable to supply audio and video, either generated or decoded by the PlayStation 3™ or PlayStation 4™ device via the Reality Synthesizer graphics unit, through audio and video connectors to a display and sound output device such as a monitor or television set having a display and one or more loudspeakers. The audio connectors may include conventional analogue and digital outputs whilst the video connectors may variously include component video, S-video, composite video and one or more High Definition Multimedia Interface (HDMI) outputs. Consequently, video output may be in formats such as PAL or NTSC, or in 720p, 1080i or 1080p high definition and 4K, HDR.

Audio processing (generation, decoding and so on) is performed by the Processor. For example, the PlayStation 3™ device's operating system supports Dolby® 5.1 surround sound, Dolby® Theatre Surround (DTS), and the decoding of 7.1 surround sound from Blu-Ray® disks.

In the present implementation, the video camera includes a CMOS (Complementary Metal Oxide Semiconductor) image sensor (although a charge-coupled device (CCD) image sensor may also be used), an LED indicator, and hardware-based real-time data compression and encoding apparatus so that compressed video data may be transmitted in an appropriate format such as an intra-image based MPEG (motion picture expert group) standard for decoding by the system unit. The camera LED indicator is arranged to illuminate in response to appropriate control data from the system unit, for example to signify adverse lighting conditions. Implementations of the video camera may variously connect to the system unit via a USB, Bluetooth® or Wi-Fi communication port. Implementations of the video camera may include one or more associated microphones and also be capable of transmitting audio data. In implementations of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit, an appropriate piece of software such as a device driver should be provided. Device driver technology is well-known and will not be described in detail here, except to say that the skilled man will be aware that a device driver or similar software interface may be required in the present implementation described.

The Processor has an architecture comprising four basic components: external input and output structures comprising a memory controller and a dual bus interface controller; a main processor referred to as the Power Processing Element; eight co-processors referred to as Synergistic Processing Elements (SPEs); and a circular data bus connecting the above components referred to as the Element Interconnect Bus. The total floating point performance of the Processor is 218 GFLOPS, compared with the 6.2 GFLOPs of the Playstation 2 device's Emotion Engine.

The Power Processing Element (PPE) is based upon a two-way simultaneous multithreading Power compliant PowerPC® core (PPU) running with an internal clock of 3.2 GHz. It comprises a 512 kB level 2 (L2) cache and a 32 kB level 1 (L1) cache. The PPE is capable of eight single position operations per clock cycle, translating to 25.6 GFLOPs at 3.2 GHz. The primary role of the PPE is to act as a controller for the Synergistic Processing Elements, which handle most of the computational workload. In operation the PPE maintains a job queue, scheduling jobs for the Synergistic Processing Elements and monitoring their progress. Consequently each Synergistic Processing Element runs a kernel whose role is to fetch a job, execute it and synchronized with the PPE.

Each Synergistic Processing Element (SPE) comprises a respective Synergistic Processing Unit (SPU), and a respective Memory Flow Controller (MFC) comprising in turn a respective Dynamic Memory Access Controller (DMAC), a respective Memory Management Unit (MMU) and a bus interface (not shown). Each SPU is a RISC processor clocked at 3.2 GHz and comprising 256 kB local RAM, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU does not directly access the system memory XDRAM 1426; the 64-bit addresses formed by the SPU are passed to the MFC which instructs its DMA controller to access memory via the Element Interconnect Bus and the memory controller.

The Element Interconnect Bus (EIB) is a logically circular communication bus internal to the Processor which connects the above processor elements, namely the PPE, the memory controller, the dual bus interface and the 8 SPEs, totaling 12 participants. Participants can simultaneously read and write to the bus at a rate of 8 bytes per clock cycle. As noted previously, each SPE comprises a DMAC for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96 B per clock, in the event of full utilization through arbitration between participants. This equates to a theoretical peak bandwidth of 307.2 GB/s (gigabytes per second) at a clock rate of 3.2 GHz (giga hertz).

The memory controller comprises an XDRAM interface, developed by Rambus Incorporated. The memory controller interfaces with the Rambus XDRAM 1426 with a theoretical peak bandwidth of 25.6 GB/s.

The dual bus interface comprises a Rambus FlexIO® system interface. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Processor and the I/O Bridge via controller and the Reality Synthesizer graphics unit via controller.

Data sent by the Processor to the Reality Synthesizer graphics unit will typically comprise display lists, being a sequence of commands to draw vertices, apply textures to polygons, specify lighting conditions, and so on.

Embodiments may include capturing depth data to better identify the real-world user and to direct activity of an avatar or scene. The object can be something the person is holding or can also be the person's hand. In this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's experience. For example, computer generated costumes can be inserted over the user's clothing, and computer generated light sources can be utilized to project virtual shadows within a video scene. Hence, using the embodiments of the present invention and a depth camera, users can experience an interactive environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. The invention may also be practiced in distributed computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method, comprising:
    receiving a selection of an interactive application for user interaction, the selection causing content of a virtual scene of the interactive application to be provided for rendering on a head mounted display (HMD) worn by a user, the content of the virtual scene includes visual options that the user can interact with for accessing additional virtual scenes of the interactive application;

detecting interactivity of the user in the virtual scene during a current interactive session, the detected interactivity processed to identify predicted interaction, by the user, with a specific one of the visual options in the virtual scene, the processing of the interactivity continues during the current interactive session while the user interacts within the virtual scene and includes evaluating interactive indicators identified from the interactivity of the user to determine when one or more of the interactive indicators directed toward the specific one of the visual option reaches a pre-defined threshold predicting imminent selection of the specific visual option, the evaluation used to gauge expressed interest of the user toward the specific visual option without requiring selection of the specific visual option, wherein evaluating includes, assigning a weight for each interactive indicator identified from the interactivity;

cumulating the weight of each of the interactive indicators in the virtual scene over time; and determining when the cumulating weight of the one or more interactive indicators directed toward the specific one of the visual options reaches the pre-defined threshold;

pre-loading content of a second virtual scene associated with the specific visual option that was predicted to be imminently selected based on achieving the pre-defined threshold, wherein the pre-loading caches the content for the second virtual scene without executing said second virtual scene; and executing the second virtual scene, upon detecting selection of the specific visual option by the user, using the pre-loaded cached content, so as to enable full rendering of the second virtual scene for interactivity by the user, wherein the virtual scene and the second virtual scene are part of the interactive application, and wherein operations of the method are performed by a processor.

2. The method of claim 1, wherein reaching the threshold includes, identifying each interactive indicator of a plurality of interactive indicators in the virtual scene, wherein each interactive indicator is associated with a corresponding visual option; and continuously evaluating each interactive indicator of the plurality of interactive indicators while the user continues to interact within the virtual scene to determine when the plurality of interactive indicators approach the threshold representing selection of the specific visual option associated with the second virtual scene.

3. The method of claim 2, further includes continuing to monitor interactivity of the user within the virtual scene, the monitored interactivity processed till the threshold of actions that is indicative of selection of a second visual option in the virtual scene is reached, wherein the second visual option is associated with a third virtual scene.

4. The method of claim 3, wherein the pre-loading includes pre-loading content of the third virtual scene.

5. The method of claim 1, wherein pre-loading further includes, continuing to evaluate each interactive indicator of plurality of interactive indicators during the pre-loading of the second virtual scene, while the user continues to interact with the virtual scene, the continued evaluation used to verify that the predicted interaction of the user provided through the plurality of interactive indicators continues to be directed toward the specific visual option associated with the second virtual scene.

6. The method of claim 5, wherein when the continued evaluation of the plurality of interactive indicators detects a switch in the selection of the visual option, storing the pre-loaded content of the second virtual scene in local cache of memory accessible to the processor.

7. The method of claim 6, further including, maintaining the pre-loaded content of the second virtual scene for a pre-defined period of time; and upon expiration of the pre-defined period of time unloading the pre-loaded content of the second virtual scene from the local cache, wherein the unloading of the pre-loaded content of the second virtual scene is performed when no user interactivity is directed toward the specific visual option associated with the second virtual scene during the pre-defined period of time.

8. The method of claim 5, wherein when the continued evaluation of the plurality of interactive indicators detects a switch in the selection of the visual option, unloading the content of the second virtual scene that was pre-loaded.

9. The method of claim 1, wherein the visual options include one or more of interactive buttons, images of interactive virtual objects, interactive textual content, and interactive floating menu.

10. The method of claim 1, wherein a plurality of interactive indicators captured during the interactivity of the user in the virtual scene include any one or combination of gaze, movement of the user within the virtual scene, movement of a body part adorned with a wearable device, and a control trigger.

11. The method of claim 1, wherein the visual options included in the virtual scene are specific to the virtual scene.

12. The method of claim 1, wherein the weight assigned to each interactive indicator is based on attributes of the interactive indicator, and wherein the weight assigned to each interactive indicator varies based on changes detected in the attributes.

\* \* \* \* \*